United States Patent
Nagara et al.

(10) Patent No.: US 10,085,237 B2
(45) Date of Patent: Sep. 25, 2018

(54) INFORMATION PROCESSING DEVICE, WIRELESS COMMUNICATION SYSTEM, AND INFORMATION PROCESSING METHOD

(71) Applicant: SONY CORPORATION, Tokyo (JP)

(72) Inventors: Toru Nagara, Tokyo (JP); Masanori Inoue, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/784,002

(22) PCT Filed: Feb. 24, 2014

(86) PCT No.: PCT/JP2014/054367
§ 371 (c)(1),
(2) Date: Oct. 12, 2015

(87) PCT Pub. No.: WO2014/171182
PCT Pub. Date: Oct. 23, 2014

(65) Prior Publication Data
US 2016/0073377 A1    Mar. 10, 2016

(30) Foreign Application Priority Data

Apr. 18, 2013 (JP) .................. 2013-087286

(51) Int. Cl.
*H04W 74/00* (2009.01)
*H04W 72/00* (2009.01)
*H04W 72/02* (2009.01)
*H04W 84/18* (2009.01)
*H04W 76/14* (2018.01)

(52) U.S. Cl.
CPC ............ *H04W 72/02* (2013.01); *H04W 76/14* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 9,370,033 B2* | 6/2016 | Habetha | ............... | H04W 76/023 |
| 2011/0034127 A1* | 2/2011 | Wentink | ............... | H04W 76/022 |
| | | | | 455/41.2 |
| 2011/0122835 A1* | 5/2011 | Naito | ................... | H04W 76/023 |
| | | | | 370/329 |
| 2012/0076049 A1* | 3/2012 | Rudolf | .............. | H04W 72/0406 |
| | | | | 370/254 |
| 2013/0337857 A1* | 12/2013 | Hassan | .................. | H04W 16/14 |
| | | | | 455/509 |

* cited by examiner

*Primary Examiner* — Erika Washington
(74) *Attorney, Agent, or Firm* — Chip Law Group

(57) ABSTRACT

The invention relates to an information processing device, wireless communication system, and information processing method to establish stable wireless communication with a terminal. The information processing device includes a frequency identifying unit configured to identify a frequency used for wireless communication between another information processing device and an access point on the basis of communication, and a communication control unit configured to use the acquired frequency to establish wireless communication with the other information processing device.

11 Claims, 13 Drawing Sheets

INFORMATION PROCESSING DEVICE, WIRELESS COMMUNICATION SYSTEM, AND INFORMATION PROCESSING METHOD

TECHNICAL FIELD

The present disclosure relates to an information processing device, a wireless communication system, and an information processing method.

BACKGROUND ART

A display transmission technique has been known in which a communication terminal such as a smartphone capable of wireless communication wirelessly communicates with a display device such as a television receiver also capable of wireless communication, thereby displaying a screen (display information) displayed on the display of the communication terminal on the display of the display device. A specific example of this display transmission technique includes a technique referred to as Miracast (registered trademark).

CITATION LIST

Non-Patent Literature

Non-Patent Literature 1: Wi-Fi CERTIFIED Wi-Fi Direct™: Personal, portable Wi-Fi(R) technology (2010)

SUMMARY OF INVENTION

Technical Problem

For example, Non-Patent Literature 1 discloses that information is transmitted and received between a communication terminal and a display device through one-to-one communication (which will also be referred to as "direct communication" below) referred to as Wi-Fi (Wireless Fidelity) Direcrt (registered trademark) between the communication terminal and the display device in the display transmission technique referred to as Miracast.

It is desired that stable wireless communication (direct communication) can be established between a display device and a communication terminal without a complicated procedure to provide the above-described display transmission technique.

Accordingly, the present disclosure provides a novel and improved information processing device, wireless communication system, and information processing method that can establish stable wireless communication with a communication terminal without a complicated procedure.

Solution to Problem

According to the present disclosure, there is provided an information processing device including: a frequency identifying unit configured to identify a frequency used for wireless communication between another information processing device and an access point on the basis of communication; and a communication control unit configured to use the acquired frequency to establish wireless communication with the other information processing device.

In addition, according to the present disclosure, there is provided a wireless communication system including: an access point; a first information processing device capable of communicating with the access point; and a second information processing device different from the first information processing device. The second information processing device includes a frequency identifying unit configured to identify a frequency used for wireless communication between the first information processing device and the access point on the basis of communication, and a communication control unit configured to use the acquired frequency to establish wireless communication with the first information processing device.

In addition, according to the present disclosure, there is provided an information processing method including: identifying a frequency used for wireless communication between another information processing device and an access point on the basis of communication; and using the acquired frequency to establish wireless communication with the other information processing device.

Advantageous Effects of Invention

According to the present disclosure as described above, it is possible to provide an information processing device, wireless communication system, and information processing method that can establish stable wireless communication with a terminal capable of communicating with an access point without a complicated procedure.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be now made in the following order.
1. Embodiment
    1.1. Analysis of Problems
    1.2. System Configuration
    1.3. Configuration of Information Processing Device
    1.4. Process Flow
2. Example 1
3. Example 2
    3.1. System Configuration
    3.2. Process Flow
        3.2.1. Report of Frequency Band via Access Point
        3.2.2. Report of Frequency Band through Contactless Communication
4. Example 3
5. Example 4
    5.1. Overview of Each Mode
    5.2. Transition between Respective Modes
    5.3. Process Flow
6. Hardware Configuration
7. Conclusion

1. Embodiment

[1.1. Analysis of Problems]

First of all, problems of the present disclosure are analyzed, and then a wireless communication system according to an embodiment of the present disclosure will be described in detail.

Figure 1:
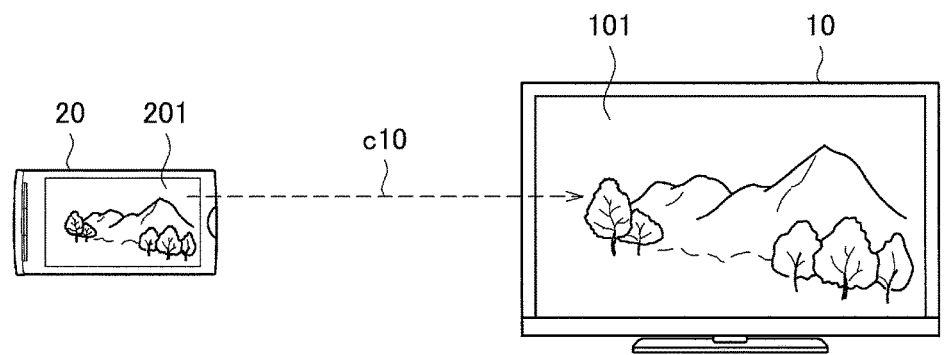
FIG. 1 is a diagram for describing an overview of a display transmission technique.

A display transmission technique has been known in which a communication terminal 20 such as a smartphone wirelessly communicates with a display device (which will also be referred to as "information processing device 10" below) such as a television receiver capable of wireless communication, thereby displaying a screen (display information) displayed on a display unit of the communication terminal 20 on a display (display unit) of the information processing device 10. A specific example of this display transmission technique includes a technique referred to as Miracast. For example, FIG. 1 is a diagram for describing the overview of the display transmission technique referred to as Miracast.

Information is transmitted and received between the communication terminal 20 and the information processing device 10 through one-to-one communication (i.e. "direct communication") referred to as Wi-Fi (Wireless Fidelity) Direct (registered trademark) between the communication terminal 20 and the information processing device 10 in the display transmission technique referred to as Miracast. For example, the communication terminal 20 is connected to the information processing device 10 through one-to-one wireless communication or establishes a communication path c10 for direct communication with the information processing device 10, and transmits information for generating a screen displayed on a display unit 201 of the communication terminal 20 to the information processing device 10 via the communication path c10 in the example illustrated in FIG. 1. The information processing device 10 generates a screen on the basis of the information received from the communication terminal 20 via the communication path c10, and displays the generated screen on the display unit 201 of the information processing device 10. Accordingly, the screen generated by the communication terminal 20 is displayed on a display unit 101 of the information processing device 10. Additionally, the wording "screen" may include not only a generated screen, but also display information for generating a screen below.

Meanwhile, the communication terminal 20 and the information processing device 10 communicate with an access point 30 such as a wireless local area network (LAN), and can communicate with another device in the LAN or an external network such as the Internet.

Figure 2:
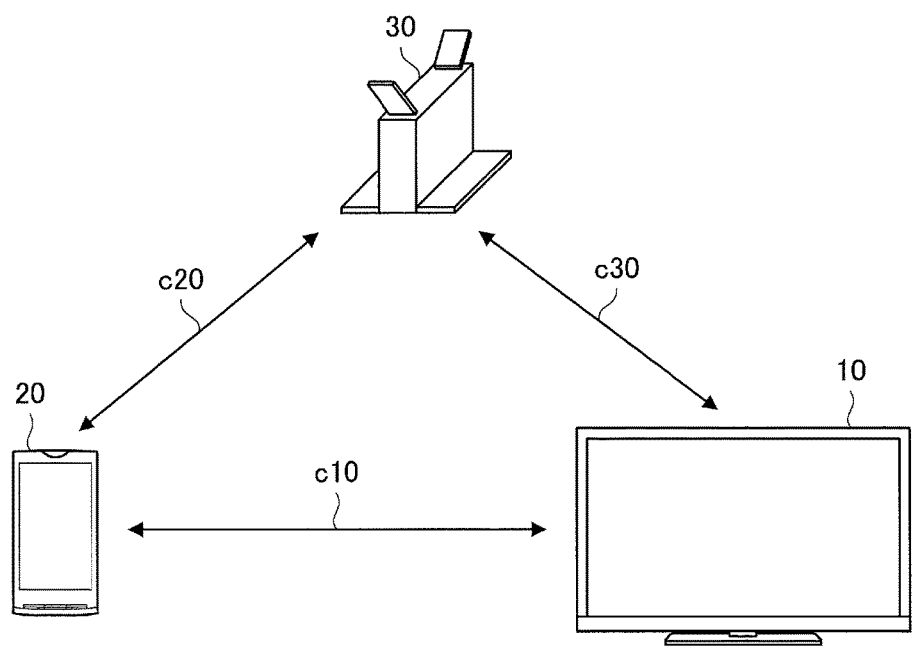
FIG. 2 is a diagram illustrating an example of a schematic configuration of a wireless communication system according to an embodiment of the present disclosure.

FIG. 2 will be now referred to. FIG. 2 is a diagram illustrating an example of a schematic configuration of the wireless communication system according to the present embodiment, and illustrates configurations that allow the information processing device 10, the communication terminal 20, and the access point 30 to wirelessly communicate with each other. Additionally, a reference numeral c10 represents a communication path for wireless communication between the information processing device 10 and the communication terminal 20 in FIG. 2. In the same way, a reference numeral c20 represents a communication path for wireless communication between the communication terminal 20 and the access point 30, and a reference numeral c30 represents a communication path for wireless communication between the information processing device 10 and the access point 30.

For example, the information processing device 10 can use even different frequencies (channels) for direct communication with the communication terminal 20 and communication between access and the point 30. As a specific example, the information processing device 10 is operable to use a channel ch1 having a frequency band of 2.4 GHz for the communication path c10, and a channel ch6 having a frequency band of 2.4 GHz for the communication path c30. In the same way, the information processing device 10 is also operable to use the 2.4-GHz band for the communication path c10 as a frequency band, and the 5-GHz band for the communication path c30 as a frequency band.

It is, however, difficult for a single communication device to concurrently establish some kinds of communication for which different frequencies are used in this way. Accordingly, the information processing device 10 can establish some kinds of communication for which different frequencies are used by causing a single communication device to switch those kinds of communication through time division, or by causing some installed communication devices to establish the respective kinds of communication.

If some kinds of communication are switched through time division, the information processing device 10 has to stop communication for which one frequency is used while the information processing device 10 is performing communication for which the other frequency is used. Switching some kinds of communication through time division thus causes delay and the like, so that stable communication becomes unavailable or the communication performance degrades in some cases. Meanwhile, if a plurality of communication devices are installed, an additional communication device is installed. Accordingly, it costs more to manufacture the information processing device 10, and the information processing device 10 and the communication terminal 20 increase in size in some cases.

The information processing device 10 thus controls the setting of each kind of communication to use the same frequency (channel) for direct communication (communication path c10) with the communication terminal 20 and communication (communication path c30) with an access point in the wireless communication system according to the present disclosure. If the same frequency is used for direct communication with a communication terminal and communication between access and a point, there is no need to switch and operate some kinds of communication for which different frequencies are used. Accordingly, it is possible to establish stable wireless communication.

It is, however, too complicated a procedure for a user to examine what frequencies are used for the respective kinds of communication among the information processing device 10, the communication terminal 20, and the access point 30, and to set the same frequency for the respective kinds of communication among the devices. Moreover, if different setting is applied to any (e.g. access point) of the respective devices, the setting of the other devices have to be changed again, making the procedure further complicated.

Accordingly, the present disclosure provides a wireless communication system that can establish respective stable wireless communication among the information processing device 10, the communication terminal 20, and the access point 30 without a complicated procedure. The wireless communication system according to the present embodiment will be described in detail below.

[1.2. System Configuration]

The configuration of the wireless communication system according to the present embodiment will be now described with reference to FIG. 2. The wireless communication system according to the present embodiment includes the information processing device 10, the communication terminal 20, and the access point 30. The information processing device 10 and the communication terminal 20 are each configured to be capable of wirelessly communicating with the access point 30 (corresponding to the communication paths c30 and c20).

If the communication terminal 20 displays a screen (display information) generated by the communication terminal 20 on the display unit 101 of the information processing device 10 with a display transmission technique such as Miracast, the communication terminal 20 establishes direct communication (communication path c10) with the information processing device 10. Any of the information processing device 10 and the communication terminal 20 then serves as an access point, and decides a frequency (channel) used for communication. Additionally, one of the information processing device 10 and the communication terminal 20 which serves as an access point will also be referred to as group owner (GO), and the other which is connected to the GO will also be referred to as client (CLI) below.

Figure 3:
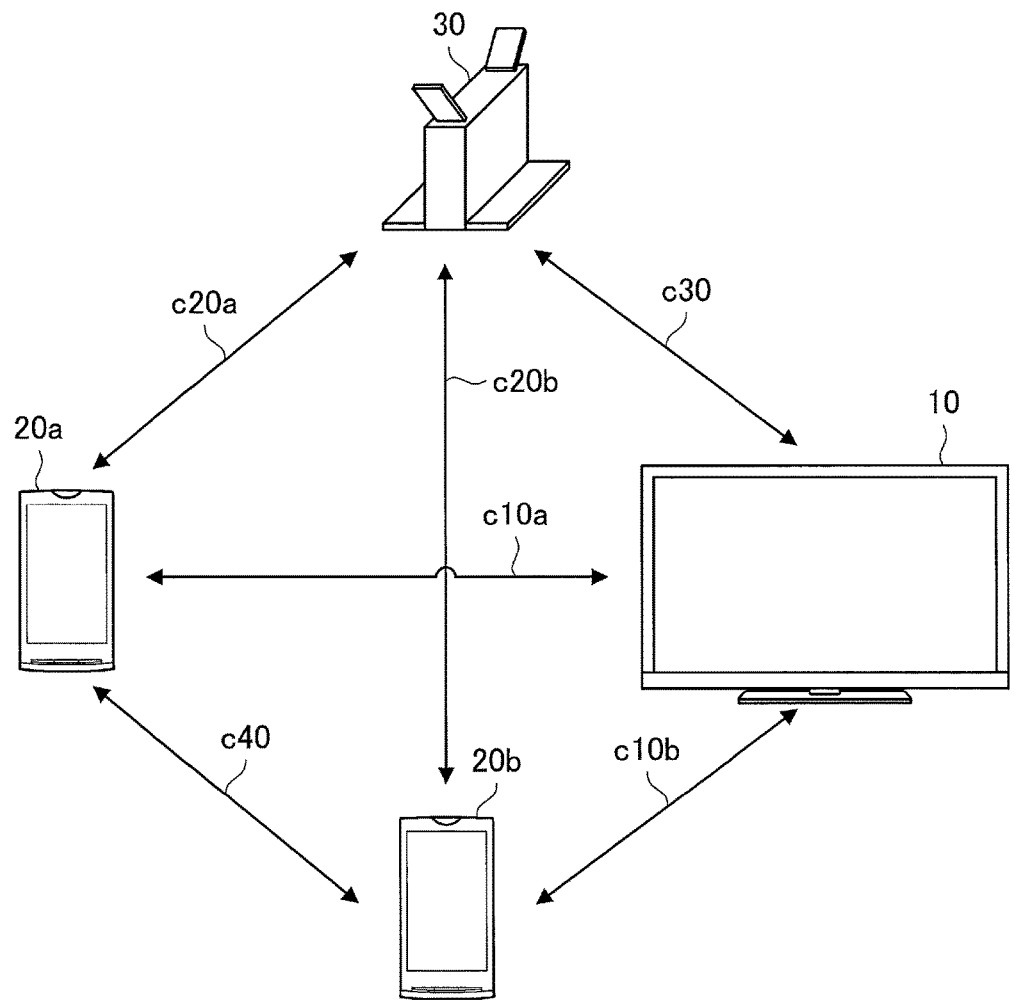
FIG. 3 is a diagram for describing a schematic connection relationship between an information processing device and a communication terminal in the wireless communication system according to the embodiment.

As discussed above, the GO serves as an access point, so that it is possible to perform direct communication with some different CLIs. FIG. 3 will be now referred to. FIG. 3 is a diagram for describing a schematic connection relationship between the information processing device 10 and the communication terminal 20 in the wireless communication system according to the present embodiment. The example illustrated in FIG. 3 shows that direct communication is established among the information processing device 10 and communication terminals 20a and 20b. The information processing device 10 has established the communication path c30 for wireless communication with the access point 30. In the same way, the communication terminal 20a has established a communication path c20a for wireless communication with the access point 30. Meanwhile, the communication terminal 20b has established a communication path c20b for wireless communication with the access point 30.

All of the information processing device 10, the communication terminal 20a, and the communication terminal 20b may serve as a GO in the example illustrated in FIG. 3. If any of the information processing device 10, the communication terminal 20a, and the communication terminal 20b serves as a GO, the other devices serve as CLIs to establish communication paths for direct communication with the GO.

For example, if the information processing device 10 (i.e. display device) serves as a GO, the communication terminals 20a and 20b serve as CLIs and both of the communication terminals 20a and 20b can transmit and receive data to and from the information processing device 10 through direct communication. That is to say, using the information processing device 10 as a GO allows, for example, the information processing device 10 to transmit and receive data to and from both of the communication terminals 20a and 20b while maintaining connection relationships with both of the communication terminals 20a and 20b. In other words, transmitting screens of the communication terminals 20a and 20b to the information processing device 10 with a display transmission technique allows the information processing device 10 to switch and display the communication terminals 20a and 20b as appropriate.

Meanwhile, it is also possible to use the information processing device 10 as a CLI. Any of the communication terminals 20a and 20b serves as a GO in this case. For example, if the communication terminal 20a serves as a GO, the communication terminal 20a can transmit and receive data to and from the information processing device 10 via the communication path c10 through direct communication. In the same way, the communication terminal 20a can transmit and receive data to and from the communication terminal 20b via the communication path c40 through direct communication. However, the information processing device 10 and the communication terminal 20b operate as CLIs at this time, so that it is difficult to establish direct communication between both of the information processing device 10 and the communication terminal 20b via the communication path c10b. Accordingly, any of the information processing device 10 and the communication terminal 20b has to serve as a GO in order to establish direct communication of the communication path c10b and display a screen of the communication terminal 20b on the information processing device 10. That is to say, the information processing device 10 has to stop or disconnect, for example, direct communication (communication path c10a) with the communication terminal 20a in order to establish direct communication of the communication path c10b.

In view of what has been described above, it is more desirable to use the information processing device 10 as a GO and to establish direct communication between the information processing device 10 and each communication terminal 20 if a screen of each communication terminal 20 is displayed on the information processing device 10 with a display transmission technique. An example will be then described below in which the information processing device 10 is used as a GO. Additionally, if the communication terminal 20 is used as a GO, the "information processing device 10" and the "communication terminal 20" shall be switched as necessary.

FIG. 2 will be now referred to again. As discussed above, the information processing device 10 thus controls the setting of each kind of communication to use the same frequency (channel) for direct communication (communication path c10) with the communication terminal 20 and communication (communication path c30) with an access point in the wireless communication system according to the present embodiment. Specifically, the information processing device 10 accesses the communication terminal 20 or the access point 30 to identify information (which will also be referred to as "frequency of the communication path c20" below) on a frequency (channel) used for communication (communication path c20) between the communication terminal 20 and the access point 30.

For example, the information processing device 10 acquires information on the frequency of the communication path c20 from the communication terminal 20. As another example, the information processing device 10 may access the access point 30 and scan a frequency (channel) used by the access point 30 to identify the frequency of the communication path c20 on the basis of a scanning result. A detailed operation of the information processing device 10 to acquire the frequency of the communication path c20 from the access point 30 will be described separately below.

After identifying the frequency of the communication path c20, the information processing device 10 checks a frequency (which will also be referred to as "frequency of the communication path c3" below) used for communication (communication path c30) between the information processing device 10 and the access point 30. If the frequency of the communication path c30 is different from the acquired frequency of the communication path c20, the information processing device 10 changes the setting of communication of the communication path c30 in a manner that the acquired frequency of the communication path c20 is used to perform communication with the access point 30. Specifically, the information processing device 10 disconnects the communication path c30, changes the setting of communication in a manner that the acquired frequency of the communication path c20 is used, and establishes the communication path c30 again. Needless to say, if the frequency of the communication path c30 is the same as the acquired frequency of the communication path c20, the information processing device 10 does not have to change the setting of communication of the communication path c30.

Once the setting is changed in a manner that the same frequency is used for the communication path c20 and the communication path c30, the information processing device 10 uses the frequency (i.e. frequency of the communication path c20) to establish direct communication with the communication terminal 20. Accordingly, the same frequency (i.e. frequency of the communication path c20) is used for the respective kinds of communication among the information processing device 10, the communication terminal 20, and the access point 30. The information processing device 10 does not thus have to switch and operate some kinds of communication for which different frequencies are used. This can also be applied to communication (communication path c10) with the information processing device 10 and communication (communication path c20) with the access point 30 as seen from the communication terminal 20. That is to say, the communication terminal 20 does not have to switch and operate some kinds of communication for which different frequencies are used. Accordingly, stable wireless communication can be established between the information processing device 10 and the communication terminal 20.

[1.3. Configuration of Information Processing Device]

Figure 4:
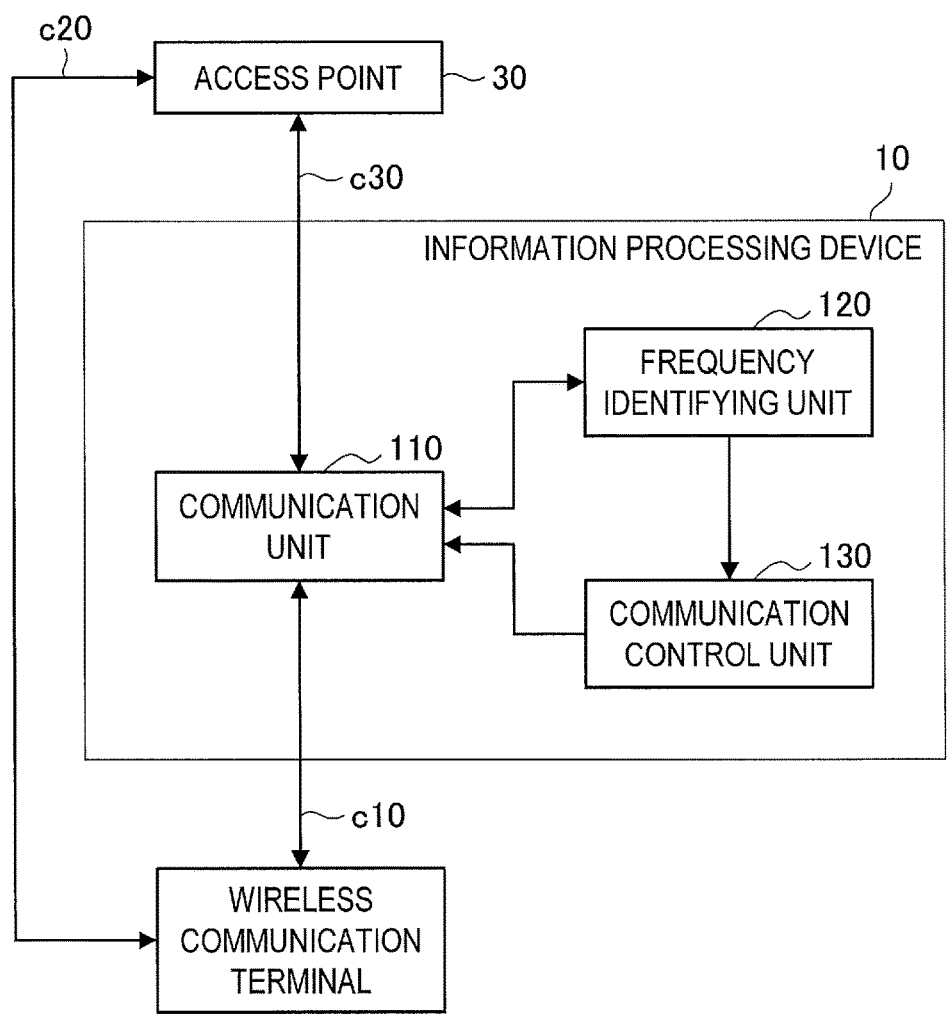
FIG. 4 is a block diagram illustrating an example of a configuration of the information processing device according to the embodiment.

Next, the configuration of the information processing device 10 according to the present embodiment will be described with reference to FIG. 4. FIG. 4 is a block diagram illustrating an example of the configuration of the information processing device 10 according to the present embodiment. As illustrated in FIG. 4, the information processing device 10 includes a communication unit 110, a frequency identifying unit 120, and a communication control unit 130.

The communication unit 110 is a communication interface that allows each structural element (such as the frequency identifying unit 120 discussed below) of the information processing device 10 to perform communication between the communication terminal 20 and the access point 30. Additionally, if each structural element of the information processing device 10 transmits and receives data to and from the communication terminal 20 and the access point 30, the data is supposed to be transmitted and received via the communication unit 110 below unless otherwise expressly stated.

The frequency identifying unit 120 accesses the communication terminal 20 or the access point 30 to identify a frequency (i.e. frequency of the communication path c20) used for communication (communication path c20) between the communication terminal 20 and the access point 30.

If the frequency identifying unit 120 identifies accesses the communication terminal 20 to identify the frequency of the communication path c20, the frequency identifying unit 120 causes the communication terminal 20 to report the frequency of the communication path c20, thereby acquiring the frequency of the communication path c20 from the communication terminal 20.

If the frequency identifying unit 120 accesses the access point 30 to identify the frequency of the communication path c20, the frequency identifying unit 120 scans a frequency (channel) used by the access point 30 to identify the frequency of the communication path c20 on the basis of a scanning result.

Additionally, the frequency identifying unit 120 may also acquire identification information (e.g. service set identifier (SSID)) for identifying the access point 30 from the communication terminal 20, and identify the access point 30 on the basis of the acquired identification information. Even if there are a plurality of access points 30, the frequency identifying unit 120 can identify the access point 30 with which the communication terminal 20 establishes a communication path by acquiring identification information for identifying the access point 30 from the communication terminal 20 in this way. Additionally, the above-described identification information for identifying the access point 30 will be described as "SSID" below. However, as long as it is possible to identify the access point 30, the above-described identification information is not limited to an "SSID." Thus, the wording "SSID" is not limited to the use of an SSID below.

The frequency identifying unit 120 reports the identified frequency of the communication path c20 to the communication control unit 130. The frequency identifying unit 120 may then report the acquired SSID to the communication control unit 130. This allows the communication control unit 130 to recognize the access point 30 with which the communication terminal 20 has established a communication path.

The communication control unit 130 is a control unit that controls an operation of the communication unit 110, and controls some kinds of communication among the information processing device 10, the communication terminal 20, and the access point 30. That is to say, the communication control unit 130 controls each of the communication paths c10 and c30 regarding what frequency is used to establish communication.

The communication control unit 130 acquires the frequency of the communication path c20 from the frequency identifying unit 120. After acquiring the frequency of the communication path c20, the communication control unit 130 checks a frequency (i.e. frequency of the communication path c30) used for communication between the information processing device 10 and the access point 30.

If the frequency of the communication path c30 is different from the acquired frequency of the communication path c20, the communication control unit 130 changes the setting of communication of the communication path c30 in a manner that the acquired frequency of the communication path c20 is used to perform communication with the access point 30. The communication control unit 130 may then disconnect the communication path c30, change the setting of communication in a manner that the acquired frequency of the communication path c20 is used, and establish the communication path c30 again.

If the frequency of the communication path c30 is the same as the acquired frequency of the communication path c20, the communication control unit 130 does not also have to change the setting of communication of the communication path c30. Needless to say, if the setting of communication is not changed, the communication control unit 130 does not have to disconnect the communication path c30 or establish the communication path c30 again.

Once the setting is changed in a manner that the same frequency is used for the communication path c20 and the communication path c30, the communication control unit 130 uses the frequency (i.e. frequency of the communication path c20) to establish direct communication with the communication terminal 20. Accordingly, the same frequency (i.e. frequency of the communication path c20) is used for the respective kinds of communication among the information processing device 10, the communication terminal 20, and the access point 30. The information processing device 10 does not thus have to switch and operate some kinds of communication for which different frequencies are used. This can also be applied to communication (communication path c10) with the information processing device 10 and communication (communication path c20) with the access point 30 as seen from the communication terminal 20. That is to say, the communication terminal 20 does not have to switch and operate some kinds of communication for which different frequencies are used. Accordingly, stable wireless communication can be established between the information processing device 10 and the communication terminal 20.

As discussed above, the above-described configuration is used for operating the information processing device 10 as a GO. If the information processing device 10 operates as a CLI, the information processing device 10 operates on the basis of an instruction from another communication device (such as the communication terminal 20) that serves as a GO. Meanwhile, if the communication terminal 20 operates as a GO, the communication terminal 20 may be configured in the same way as the configuration of the information processing device 10.

[1.4. Process Flow]
{1.4.1. Frequency Acquired from Communication Terminal 20}

Next, an operation of the frequency identifying unit 120 of the information processing device 10 to identify the frequency of the communication path c20 will be described in detail below with reference to FIGS. 5 and 6.

First of all, an operation of the frequency identifying unit 120 to acquire the frequency of the communication path c20 from the communication terminal 20 will be described with reference to FIG. 5. FIG. 5 is an example of a communication sequence of the wireless communication system according to the present embodiment, and illustrates an example flow of an operation of the frequency identifying unit 120 to acquire the frequency of the communication path c20 from the communication terminal 20. Additionally, the example illustrated in FIG. 5 shows that the information processing device 10 operates as a GO.

(Step S111)
First of all, the information processing device 10 transitions to a mode in which the information processing device 10 operates as a GO, and waits for a connection request from a CLI.

(Step S152)
The communication terminal 20 is instructed by a user to transfer (i.e. direct communication with the information processing device 10) a screen to the information processing device 10 with a display transmission technique.

(Step S121)
If wireless communication has been established with the access point 30, the communication terminal 20 disconnects the wireless communication upon receiving the instruction from the user.

(Step S122)
After disconnecting wireless communication with the access point 30, the communication terminal 20 transitions to a preparation state to establish direct communication. Additionally, this preparation state is a mode for deciding as which of a GO and a CLI the communication terminal 20 operates, and it is not decided at this moment as which of a GO and a CLI the communication terminal 20 operates.

(Step S123)
After transitioning to the preparation state, the communication terminal 20 searches for a nearby communication device capable of direct communication. As a specific example, the communication terminal 20 may receive a beacon from a nearby communication device, and recognize the nearby communication device by using the beacon. As another example, the communication terminal 20 transmits a request (such as a probe request) to the information processing device 10 that is a beacon distribution source for checking whether or not the information processing device 10 can communicate with the communication terminal 20. The communication terminal 20 can then recognize the information processing device 10 as a partner capable of communication by acquiring a response (such as a probe response) from the information processing device 10. In this way, the communication terminal 20 recognizes the presence of the information processing device 10 that operates as a GO.

(Step S124)
After recognizing a list of communication devices capable of direct communication, the communication terminal 20 presents the recognized list of communication devices to a user.

(Step S154)

The communication terminal 20 receives, from a user, the designation of a communication device with which direct communication is established. Let us here assume that the information processing device 10 that operates as a GO is designated as a communication partner.

(Step S125)

Once a user designates a communication device with which direct communication is established, the communication terminal 20 decides a mode (i.e. GO or CLI) in which the communication terminal 20 operates in accordance with the operation mode of the designated communication device. When the information processing device 10 that operates as a GO is designated as a communication partner, the communication terminal 20 transitions to a mode in which the communication terminal 20 operates as a CLI in order to establish direct communication with the information processing device 10.

(Step S190)

Once the operation mode transitions to a CLI, the communication terminal 20 transmits, as a CLI, a connection request of direct communication to the information processing device 10 that serves as a GO. Once the information processing device 10 receives a connection request from the communication terminal 20, the information processing device 10 uses a frequency that is currently being used for the communication path c30 to establish the communication path c10 for direct communication with the communication terminal 20.

(Step S126)

The communication terminal 20 reports, to the information processing device 10, the SSID of the access point 30 to which the communication terminal 20 is connected and a frequency (i.e. frequency of the communication path c20) used for communication with the access point 30.

(Step S112)

The frequency identifying unit 120 of the information processing device 10 acquires the SSID of the access point 30 and the frequency of the communication path c20 from the communication terminal 20. The frequency identifying unit 120 reports the acquired SSID and the acquired frequency of the communication path c20 to the communication control unit 130 of the information processing device 10.

The communication control unit 130 of the information processing device 10 acquires the SSID of the access point 30 and the frequency of the communication path c20 from the frequency identifying unit 120. The communication control unit 130 compares the acquired SSID and the acquired frequency with the SSID of the access point 30 that the information processing device 10 accesses and a frequency (i.e. frequency of the communication path c30) used for communication with the access point 30. These comparison results allow the communication control unit 130 to recognize whether or not the frequency of the communication path c20 is equal to the frequency of the communication path c30.

(Step S113)

After acquiring the SSID and the frequency transmitted from the communication terminal 20, the communication control unit 130 reports to the communication terminal 20 that the communication control unit 130 has acquired the SSID and the frequency. This allows the communication terminal 20 to recognize that the SSID and the frequency transmitted to the information processing device 10 have been correctly received by the information processing device 10.

(Step S114)

Next, the communication control unit 130 of the information processing device 10 reports to the communication terminal 20 that a frequency (i.e. frequency of the communication path c30) used by the information processing device 10 for communication with the access point 30 is changed into the frequency (i.e. frequency of the communication path c20) reported from the communication terminal 20.

(Step S115)

If the frequency of the communication path c20 acquired from the communication terminal 20 is different from the frequency of the communication path c30 set by the information processing device 10, the communication control unit 130 changes the set frequency of the communication path c30 into the acquired frequency of the communication path c20. The communication control unit 130 may then change the set access point 30 that the information processing device 10 accesses into the access point indicated by the acquired SSID. Accordingly, if the information processing device 10 establishes wireless communication with the access point 30, the information processing device 10 is connected to the same access point 30 as that of the communication terminal 20 at the same frequency (channel).

(Step S127)

Once the communication terminal 20 receives a report shown in step S114 from the information processing device 10, the communication terminal 20 prepares for a reconnection of communication with the disconnected access point 30. If a frequency (i.e. frequency of the communication path c20) used by the communication terminal 20 is different from the frequency (i.e. frequency of the communication path c30) reported from the information processing device 10, the communication terminal 20 may change the set frequency used by the communication terminal 20 into the frequency reported from the information processing device 10.

(Step S128)

Once the communication terminal 20 completes preparing for a reconnection of communication with the disconnected access point 30, the communication terminal 20 establishes communication with the access point 30 again.

In this way, direct communication (communication path c10) is established between the information processing device 10 and the communication terminal 20, and the same frequency is used for the respective kinds of communication among the information processing device 10, the communication terminal 20, and the access point 30. That is to say, both of the information processing device 10 and the communication terminal 20 do not have to switch and operate some kinds of communication for which different frequencies are used. Accordingly, stable wireless communication can be established between the information processing device 10 and the communication terminal 20.

{1.4.2. Access to Access Point 30 for Identifying Frequency}

Next, an operation of the frequency identifying unit 120 to access the access point 30 to identify the frequency of the communication path c20 will be described with reference to FIG. 6. FIG. 6 is an example of a communication sequence of the wireless communication system according to the present embodiment, and illustrates an example flow of an operation of the frequency identifying unit 120 to access the access point 30 to identify the frequency of the communication path c20.

(Step S221)

Figure 6:
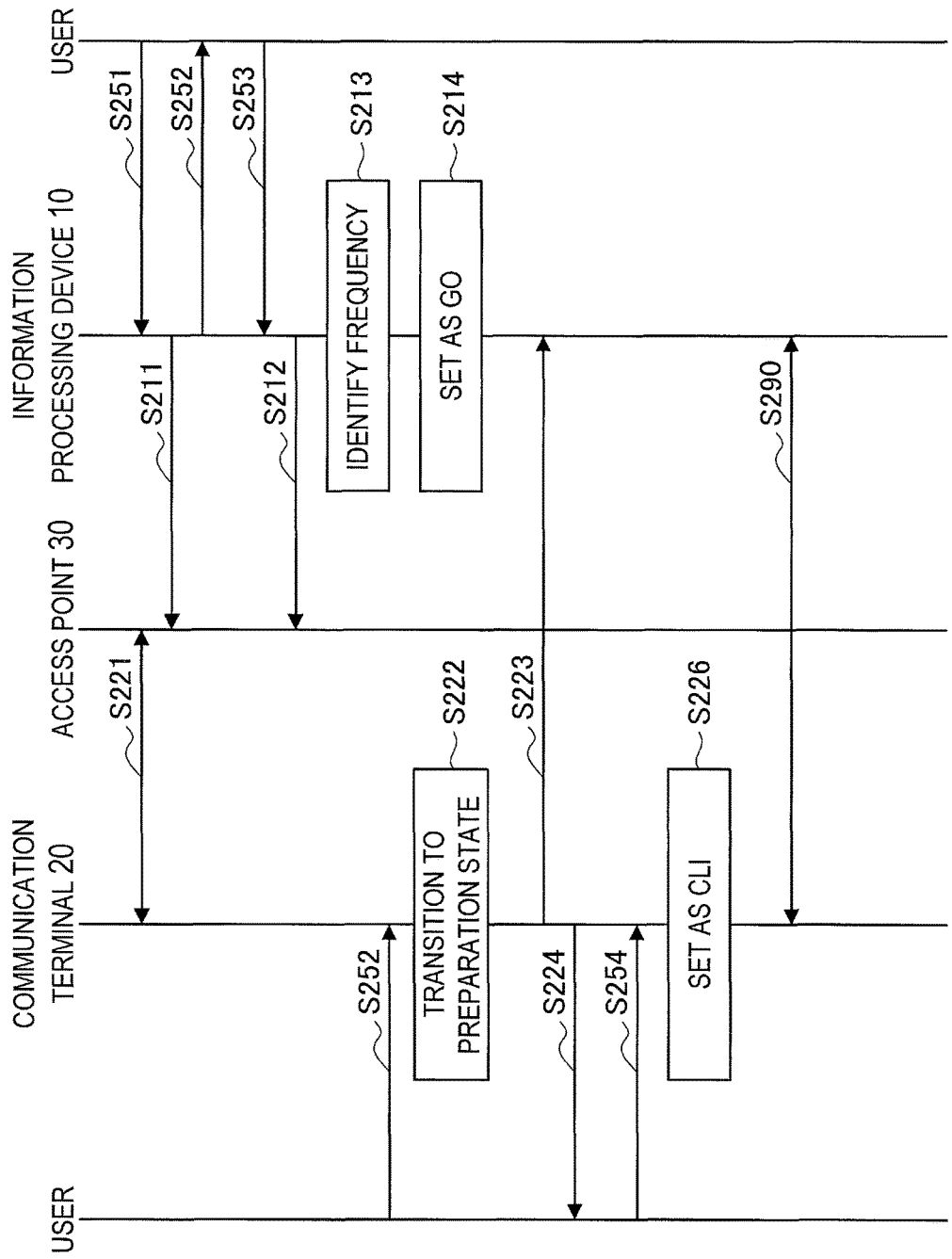
FIG. 6 is an example of a communication sequence of the wireless communication system according to the embodiment.

Let us assume in the example illustrated in FIG. 6 that the communication terminal 20 has established wireless communication (communication path c20) with the access point 30.

(Step S251)

The information processing device 10 is instructed by a user to display a list of nearby access points 30.

(Step S211)

Once the information processing device 10 is instructed by a user, the information processing device 10 searches for the nearby access point 30. As a specific example, the information processing device 10 receives a beacon from the nearby access point 30, and recognizes the nearby access point 30 by using the beacon.

(Step S252)

The information processing device 10 presents a list of recognized access points 30 to a user on the basis of a search result.

(Step S253)

The information processing device 10 receives the designation of the access point 30 from a user. Let us here assume that the access point 30 with which the communication terminal 20 has established communication is designated as a communication partner.

(Step S212)

Once the information processing device 10 receives the designation of the access point 30 from a user, the frequency identifying unit 120 of the information processing device 10 accesses the designated access point 30 and scans a frequency (channel) used by the access point 30.

(Step S213)

A frequency used between the communication terminal 20 and the access point 30 is then extracted as a scanning result. That is to say, the frequency identifying unit 120 can identify a frequency used between the communication terminal 20 and the access point 30 on the basis of a scanning result. If a plurality of candidates for the used frequency are extracted as a scanning result, the frequency identifying unit 120 may present the extracted candidates to a user and identify a frequency designated by the user from the candidates as a frequency (i.e. frequency of the communication path c20) used between the communication terminal 20 and the access point 30.

(Step S214)

After identifying the frequency of the communication path c20, the information processing device 10 transitions to a mode in which the information processing device 10 operates as a GO, and waits for a connection request from a CLI.

(Step S252)

The communication terminal 20 is instructed by a user to transfer (i.e. direct communication with the information processing device 10) a screen to the information processing device 10 with a display transmission technique.

(Step S222)

Once the communication terminal 20 is instructed by a user, the communication terminal 20 transitions to the preparation state to establish direct communication.

(Step S223)

After transitioning to the preparation state, the communication terminal 20 searches for a nearby communication device capable of direct communication. Additionally, the operations according to steps S222 and S223 are the same as those in steps S122 and S123 (see FIG. 5).

(Step S224)

After recognizing a list of communication devices capable of direct communication, the communication terminal 20 presents the recognized list of communication devices to a user.

(Step S254)

The communication terminal 20 receives, from a user, the designation of a communication device with which direct communication is established. Let us here assume that the information processing device 10 that operates as a GO is designated as a communication partner.

(Step S226)

Once a user designates a communication device with which direct communication is established, the communication terminal 20 decides a mode (i.e. GO or CLI) in which the communication terminal 20 operates in accordance with the operation mode of the designated communication device. When the information processing device 10 that operates as a GO is designated as a communication partner, the communication terminal 20 transitions to a mode in which the communication terminal 20 operates as a CLI in order to establish direct communication with the information processing device 10.

(Step S290)

Once the operation mode transitions to a CLI, the communication terminal 20 transmits, as a CLI, a connection request of direct communication to the information processing device 10 that serves as a GO. Once the information processing device 10 receives a connection request from the communication terminal 20, the information processing device 10 uses the identified frequency of the communication path c20 to establish the communication path c10 for direct communication with the communication terminal 20.

Additionally, after the communication path c10 for direct communication with the communication terminal 20 is established, the communication control unit 130 of the information processing device 10 may change the set frequency of the communication path c30 as in the process in step S115. That is to say, if the frequency of the communication path c20 is different from the frequency of the communication path c30 set by the information processing device 10, the communication control unit 130 may change the set frequency of the communication path c30 into the acquired frequency of the communication path c20. The communication control unit 130 may change the set access point 30 that the information processing device 10 accesses into the access point indicated by the acquired SSID. Accordingly, if the information processing device 10 establishes wireless communication with the access point 30, the information processing device 10 is connected to the same access point 30 as that of the communication terminal 20 at the same frequency (channel).

In this way, direct communication (communication path c10) is established between the information processing device 10 and the communication terminal 20, and the same frequency is used for the respective kinds of communication among the information processing device 10, the communication terminal 20, and the access point 30. That is to say, both of the information processing device 10 and the communication terminal 20 do not have to switch and operate some kinds of communication for which different frequencies are used. Accordingly, stable wireless communication can be established between the information processing device 10 and the communication terminal 20.

{1.4.3. Change in Set Frequency of Access Point}

Figure 7:
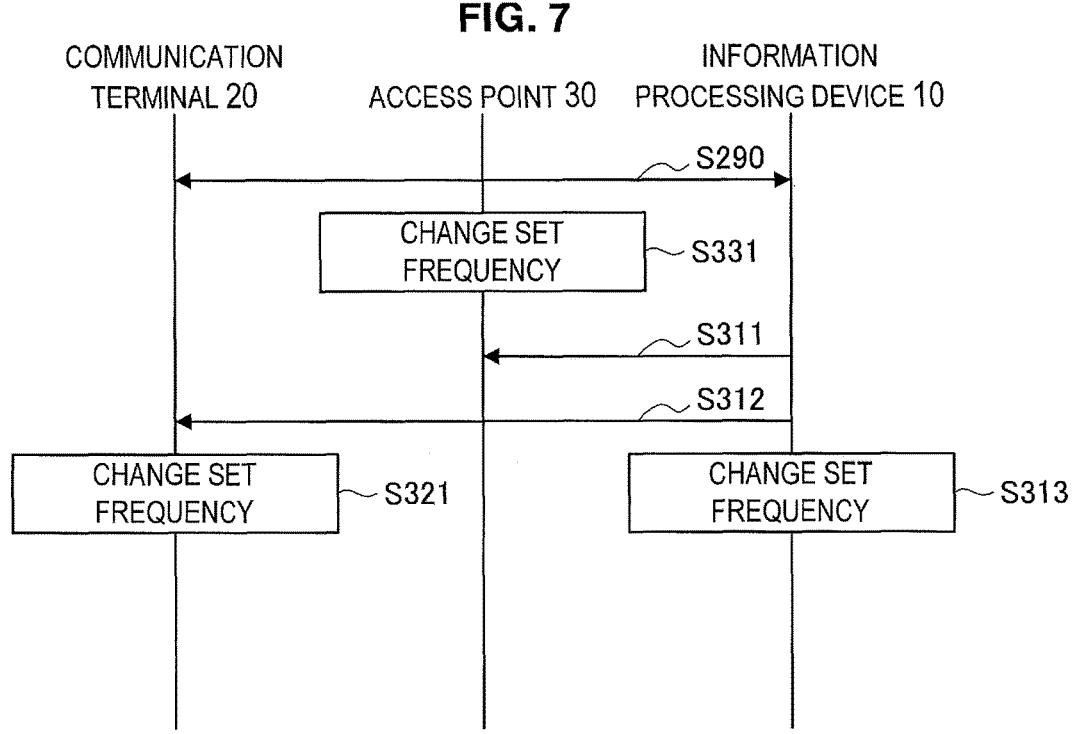
FIG. 7 is an example of a communication sequence of the wireless communication system according to the embodiment.

Next, the operations of the information processing device 10 and the communication terminal 20 will be described for a change in a set frequency used by the access point 30 with reference to FIG. 7. FIG. 7 is an example of a communication sequence of the wireless communication system according to the present embodiment, and illustrates an example flow of a series of operations of the information processing device 10 and the communication terminal 20 for a change in a set frequency used by the access point 30.

(Step S290)

Figure 5:
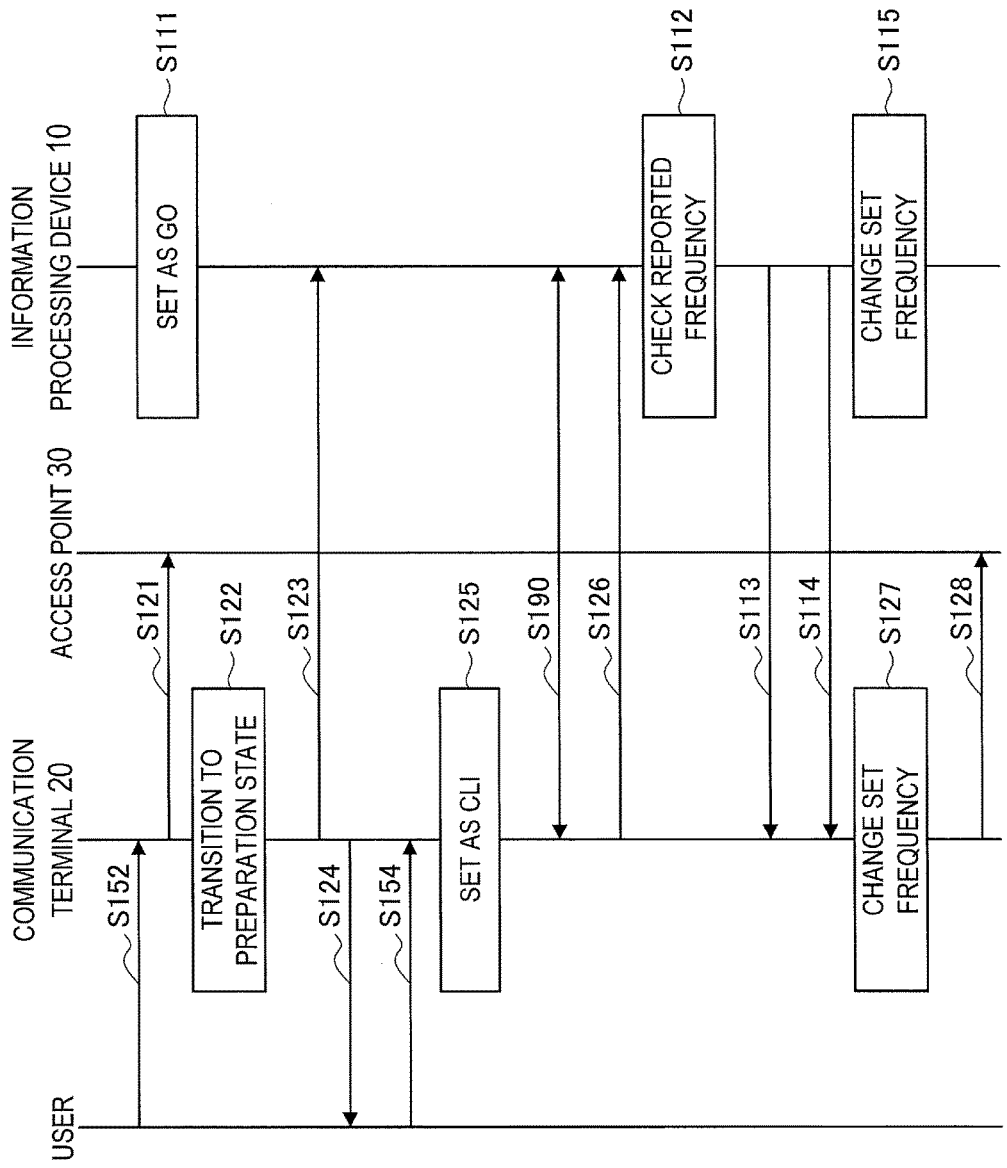
FIG. 5 is an example of a communication sequence of the wireless communication system according to the embodiment.

Step S290 in FIG. 7 corresponds to step S190 illustrated in FIG. 5 and S290 illustrated in FIG. 6. That is to say, let us assume that direct communication has been established between the information processing device 10 and the communication terminal 20.

(Step S331)

Let us assume that a set frequency (channel) usable by the access point 30 is changed with direct communication established between the information processing device 10 and the communication terminal 20.

(Step S311)

In this case, the information processing device 10 accesses the access point 30, and scans a frequency (channel) usable by the access point 30. The information processing device 10 identifies a frequency to be used for some kinds of communication with both of the communication terminal 20 and the access point 30 from frequencies extracted as a scanning result. The information processing device 10 then identifies the same frequency for some kinds of communication with both of the communication terminal 20 and the access point 30.

(Step S312)

After identifying a frequency, the information processing device 10 reports the identified frequency to the communication terminal 20.

(Step S313)

The communication control unit 130 of the information processing device 10 changes a set frequency used for direct communication (communication path c10) with the communication terminal 20 into the identified frequency. The communication control unit 130 may then change the set frequency of the communication path c30 into the identified frequency.

(Step S321)

The communication terminal 20 acquires a frequency used for direct communication (communication path c10) from the information processing device 10. The communication terminal 20 changes a set frequency used for direct communication with the information processing device 10 into the frequency acquired from the information processing device 10. Additionally, the communication terminal 20 may then disconnect direct communication with the information processing device 10 and establish the direct communication again in order to reflect the changed set frequency.

In addition, the communication terminal 20 may also change a set frequency used for wireless communication (communication path c20) with the access point 30 into the frequency acquired from the information processing device 10. The communication terminal 20 may then disconnect wireless communication with the access point 30, and establish the wireless communication again in order to reflect the changed set frequency.

In this way, while the set frequency of the access point 30 is changed, set frequencies used for some kinds of communication among the information processing device 10, the communication terminal 20, and the access point 30 are also updated in the wireless communication system according to the present embodiment. Accordingly, even if the set frequency of the access point 30 is changed, stable wireless communication is maintained between the information processing device 10 and the communication terminal 20 without imposing a complicated procedure on a user.

2. Example 1

Figure 8:
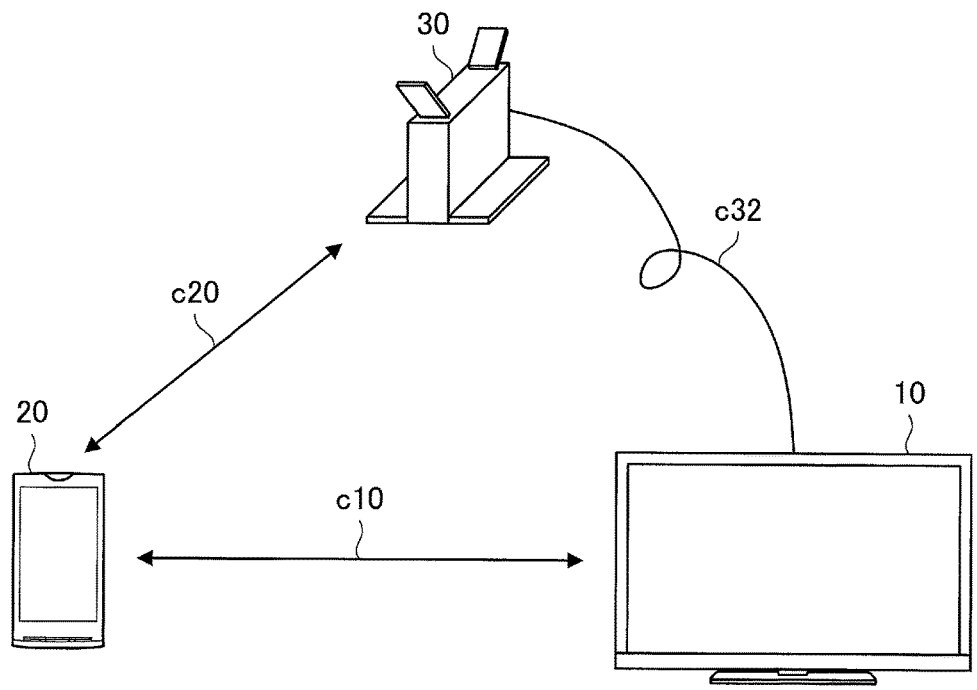
FIG. 8 is a diagram illustrating an example of a schematic configuration of a wireless communication system according to an example 1.

Next, a wireless communication system according to an example 1 will be described with reference to FIG. 8. FIG. 8 is a diagram illustrating a schematic configuration of the wireless communication system according to the example 1. As illustrated in FIG. 8, the wireless communication system according to the example 1 includes an information processing device 10, a communication terminal 20, and an access point 30 as in the above-described embodiment. Meanwhile, the wireless communication system according to the example 1 is different from the wireless communication system in the above-described embodiment in that the wireless communication system according to the example 1 has wired communication between the information processing device 10 and the access point 30 via a cable such as a LAN cable. A wired communication path between the information processing device 10 and the access point 30 will also be referred to as communication path c32 below.

As illustrated in FIG. 8, the information processing device 10 according to the present example is connected to the access point 30 via the wired communication path c32. In this case, an operation of the information processing device 10 for wireless communication with the access point 30 is off, and the information processing device 10 communicates with the access point 30 through a communication device used for wired communication. It has a great influence on stable communication between the information processing device 10 and the communication terminal 20 in the wireless communication system according to the present example whether or not the communication terminal 20 switches and operates some kinds of communication for which different frequencies are used.

Meanwhile, if the conventional information processing device 10 establishes direct communication (communication path c10) with the communication terminal 20, a vacant frequency (channel) that is not used for the communication path c20 between the communication terminal 20 and the access point 30 is selected in some cases in a manner that the communication performance is improved from the perspective of direct communication alone. That is to say, the information processing device 10 uses a frequency different from the frequency of the communication path c20 to establish direct communication (communication path c10) with the communication terminal 20 in this case, making the above-described problems apparent. If the communication terminal 20 that serves as a CLI does not support a mode in which the communication terminal 20 is operable to switch different frequencies in this case, the communication path c10 is not probably established in some cases.

Accordingly, even if the information processing device 10 is connected to the access point 30 via the wired communication path c32 as in the present example, the information processing device 10 uses the frequency of the communication path c20 to establish direct communication with the communication terminal 20. Accordingly, there is no need for the communication terminal 20 to be operable to switch different frequencies, so that it is possible to establish stable wireless communication between the information processing device 10 and the communication terminal 20.

Additionally, the frequency identifying unit 120 of the information processing device 10 according to the present example just accesses the communication terminal 20 to acquire the frequency of the communication path c20 from the communication terminal 20 (see FIG. 5). Accordingly, the communication control unit 130 just uses the frequency of the communication path c20 acquired by the frequency identifying unit 120 from the communication terminal 20 to establish direct communication with the communication terminal 20.

According to the above-described configuration, direct communication (communication path c10) is established between the information processing device 10 and the communication terminal 20, and the same frequency band is used for the respective kinds of communication among the information processing device 10, the communication terminal 20, and the access point 30. That is to say, the communication terminal 20 does not have to switch and operate some kinds of communication for which different frequency bands are used. Accordingly, stable wireless communication can be established between the information processing device 10 and the communication terminal 20.

3. Example 2

[3.1. System Configuration]

Figure 9:
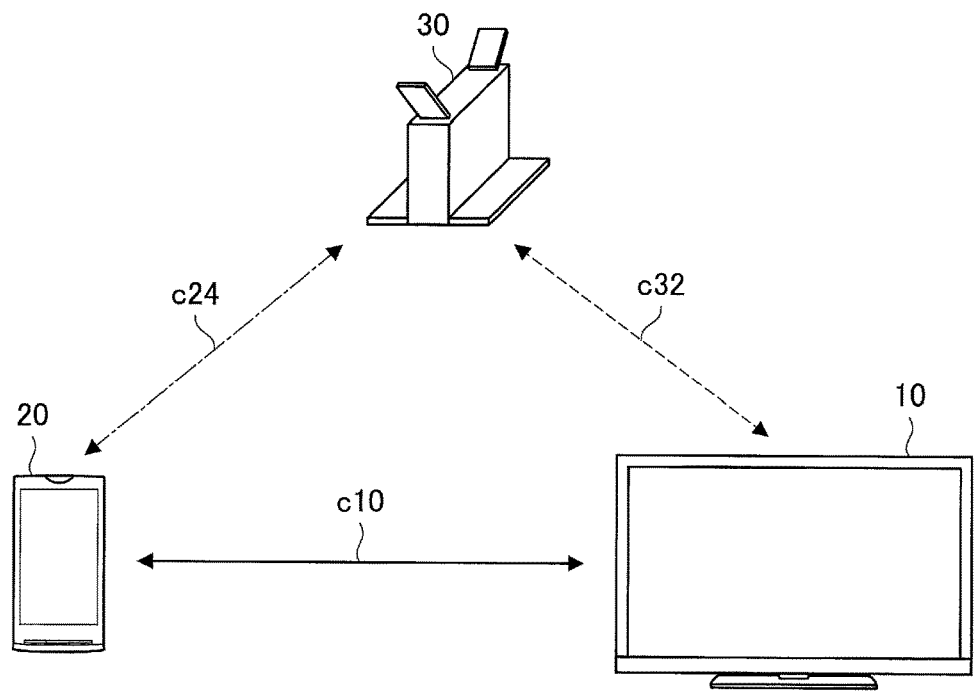
FIG. 9 is a diagram illustrating an example of a schematic configuration of a wireless communication system according to an example 2.

An example has been described in the above-described embodiment in which frequencies (channels) used for respective kinds of communication among the information processing device 10, the communication terminal 20, and the access point 30 are controlled (switched). Meanwhile, a technique of switching some different frequency bands as appropriate to establish wireless communication with another communication device has been gaining widespread use recently. As a specific example, recent communication devices (such as the information processing device 10, the communication terminal 20, and the access point 30) can select a frequency band of 5 GHz in addition to a frequency band of 2.4 GHz. Accordingly, it will be described in an example 2 with reference to FIG. 9 that the information processing device 10, the communication terminal 20, and the access point 30 can wirelessly communicate with another communication device by switching a plurality of frequency bands (such as the 2.4-GHz band and the 5-GHz band). FIG. 9 is a diagram illustrating a schematic configuration of the wireless communication system according to the example 2.

As illustrated in FIG. 9, the wireless communication system according to the example 2 includes an information processing device 10, a communication terminal 20, and an access point 30 as in the above-described embodiment. The information processing device 10 establishes the communication path c32 for which the 2.4-GHz band is used through wireless communication with the access point 30 in the example illustrated in FIG. 9. Meanwhile, the communication terminal 20 establishes a communication path c24 for which the 5-GHz band is used as a frequency band different from that of the communication path c32 through wireless communication with the access point 30.

Let us assume that the information processing device 10 uses the same frequency band (2.4-GHz band) as that of the communication path c32 to establish the communication path c10 for direct communication with the communication terminal 20 in such a situation. In this case, the communication terminal 20 has to communicate with the information processing device 10 and the access point 30 while switching communication of the 2.4-GHz band (communication path c10) and communication of the 5-GHz band (communication path c24). That is to say, as discussed above, delay or the like is caused, so that stable communication become unavailable, or the communication performance degrades in some cases.

Let us assume that the information processing device 10 uses the same frequency band (5-GHz band) as that of the communication path c24 to establish the communication path c10 for direct communication with the communication terminal 20. In this case, the information processing device 10 has to communicate with the communication terminal 20 and the access point 30 while switching communication of the 2.4-GHz band (communication path c30) and communication of the 5-GHz band (communication path c10). That is to say, as discussed above, delay or the like is caused, so that stable communication become unavailable, or the communication performance degrades in some cases.

Accordingly, the information processing device 10 accesses the communication terminal 20 or the access point 30 to identify a frequency band (which will also be as "frequency band of the communication path c24" below) used for the communication path c24 in the wireless communication system according to the present example. The information processing device 10 then changes the set frequency band of the communication path c32 in a manner that a frequency band (which will also be referred to as "frequency band of the communication path c32" below") used for communication (communication path c32) between the information processing device 10 and the access point becomes the same as the identified frequency band of the communication path c24.

Specifically, the frequency identifying unit 120 of the information processing device 10 accesses the communication terminal 20 or the access point 30 to identify a frequency band (i.e. frequency band of the communication path c24) used for communication (communication path c24) between the communication terminal 20 and the access point 30. The frequency identifying unit 120 reports the identified frequency band of the communication path c24 to the communication control unit 130.

The communication control unit 130 acquires the frequency band of the communication path c24 from the frequency identifying unit 120. After acquiring the frequency band of the communication path c24, the communication control unit 130 checks a frequency band (i.e. frequency band of the communication path c32) used for communication between the information processing device 10 and the access point 30.

If the frequency band of the communication path c32 is different from the acquired frequency band of the communication path c24, the communication control unit 130 changes the setting of communication of the communication path c32 in a manner that the acquired frequency band of the communication path c24 is used to perform communication with the access point 30. The communication control unit 130 may then disconnect the communication path c32, change the setting of communication in a manner that the acquired frequency band of the communication path c24 is used, and establish the communication path c32 again.

Once the setting is changed in a manner that the same frequency band is used for the communication path c24 and the communication path c32, the communication control unit 130 uses the frequency band (i.e. frequency band of the communication path c24) to establish direct communication with the communication terminal 20. Accordingly, the same frequency band (i.e. frequency band of the communication path c20) is used for the respective kinds of communication among the information processing device 10, the communication terminal 20, and the access point 30. The information processing device 10 does not thus have to switch and operate some kinds of communication for which different frequency bands are used. This can also be applied to communication (communication path c10) with the information processing device 10 and communication (communication path c24) with the access point 30 as seen from the communication terminal 20. That is to say, the communication terminal 20 does not have to switch and operate some kinds of communication for which different frequency bands are used. Accordingly, stable wireless communication can be established between the information processing device 10 and the communication terminal 20.

In this way, even if each of the information processing device 10 and the communication terminal 20 uses a different frequency band to communicate with the access point 30, the wireless communication system according to the example 2 changes the setting in a manner that the same frequency band is used for each communication path. Accordingly, there is no need for each of the information processing device 10 and the communication terminal 20 to switch and operate some kinds of communication for which different frequency bands are used, so that it is possible to establish stable wireless communication between the information processing device 10 and the communication terminal 20.

Additionally, the communication path c24 is obtained by using a frequency band of 5 GHz for the above-described communication path c20. In the same way, the communication path c32 is obtained by using a frequency band of 2.4 GHz for the above-described communication path c30. Accordingly, if a frequency band to be used is not designated in particular, the communication path c24 will also be described as the "communication path c20," and the communication path c32 will also be described as the "communication path c30" below.

[3.2. Process Flow]

{3.2.1. Report of Frequency Band Via Access Point}

Next, as an example of a method for the information processing device 10 to acquire the frequency of the communication path c20 from the communication terminal 20, an example of a method different from the methods illustrated in FIGS. 5 to 7 will be described. For example, the information processing device 10 establishes communication with the communication terminal 20, and acquires the frequency of the communication path c20 via the established communication path in the example illustrated in FIG. 5. Meanwhile, the information processing device 10 may also acquire the frequency of the communication path c20 from the communication terminal 20 via the access point 30. This is also applied to frequency bands. An example in which the information processing device 10 acquires the frequency band of the communication path c20 from the communication terminal 20 will be described below, but the same method can also be applied when the frequency of the communication path c20 is acquired. Thus, what will be described for the "frequency band" can also be applied to the "frequency."

Figure 10:
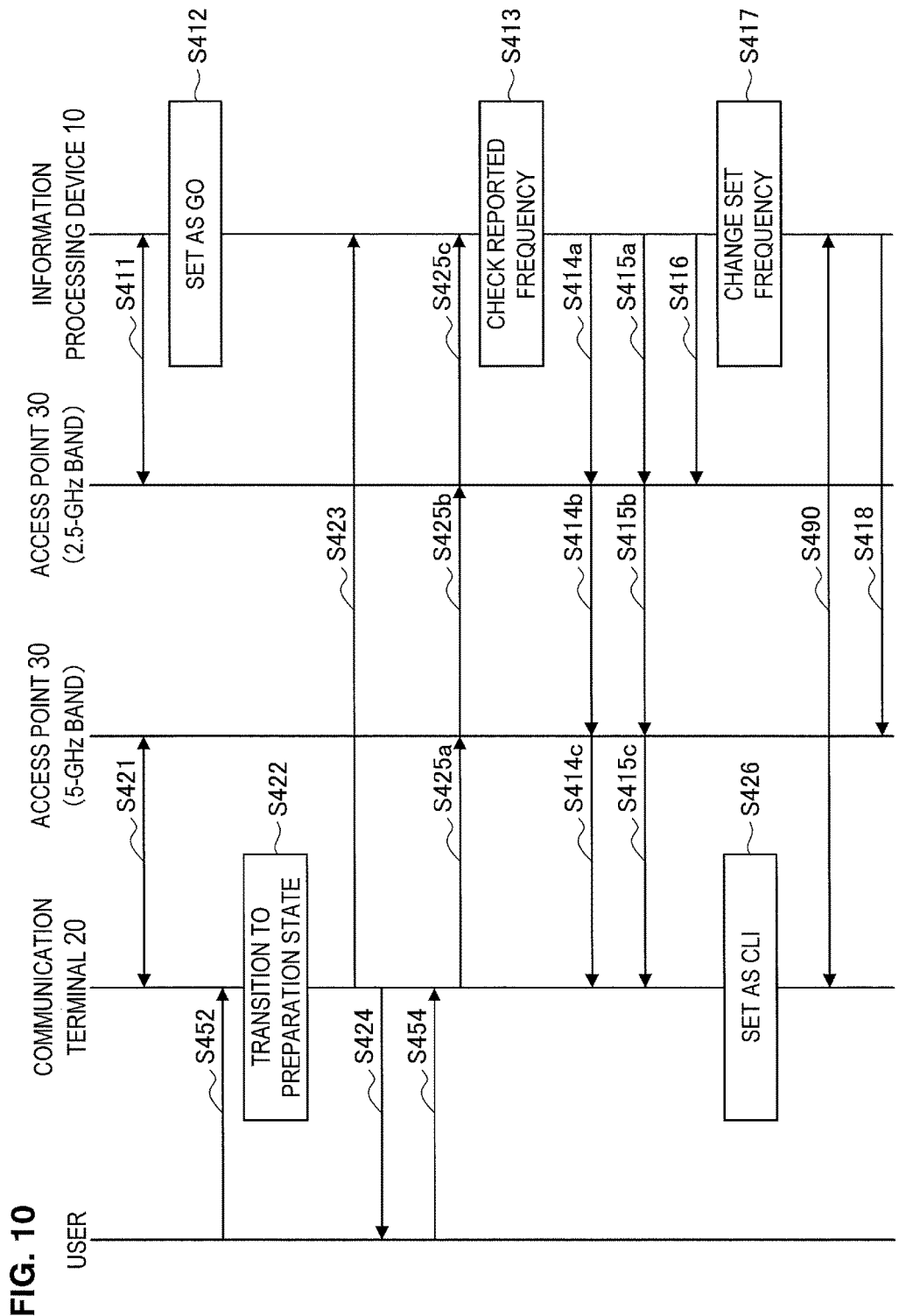
FIG. 10 is an example of a communication sequence of the wireless communication system according to the example.

For example, the example illustrated in FIG. 10 shows an example of an operation of the frequency identifying unit 120 of the information processing device 10 to acquire the frequency of the communication path c20 from the communication terminal 20 via the access point 30. FIG. 10 is an example of a communication sequence of the wireless communication system according to the present embodiment, and illustrates an example flow of an operation of the frequency identifying unit 120 to acquire the frequency of the communication path c20 from the communication terminal 20 via the access point 30.

(Step S411)

Let us assume in the example illustrated in FIG. 10 that the information processing device 10 has established wireless communication (communication path c30) with the access point 30 (which will also be referred to as "access point 30 (2.4-GHz band)" below) that uses the 2.4-GHz band.

(Step S421)

Let us assume in the example illustrated in FIG. 10 that communication terminal 20 has established wireless communication (communication path c20) with the access point 30 (which will also be referred to as "access point 30 (5-GHz band)" below) that uses the 5-GHz band.

Additionally, the example illustrated in FIG. 10 shows an example in which the access point 30 (2.4-GHz band) and the access point 30 (5-GHz band) are configured as the same access point 30 (same housing). However, the configurations of the access point 30 (2.4-GHz band) and the access point 30 (5-GHz band) are not limited as long as the information processing device 10 can communicate with the communication terminal 20 via the access point 30 (2.4-GHz band) and the access point 30 (5-GHz band). For example, the access point 30 (2.4-GHz band) and the access point 30 (5-GHz band) may also be different access points 30 (different housings).

(Step S412)

Additionally, the example illustrated in FIG. 10 shows that the information processing device 10 operates as a GO. That is to say, first of all, the information processing device 10 transitions to a mode in which the information processing device operates as a GO, and waits for a connection request from a CLI.

(Step S452)

The communication terminal 20 is instructed by a user to transfer (i.e. direct communication with the information processing device 10) a screen to the information processing device 10 with a display transmission technique.

(Step S422)

Once the communication terminal 20 is instructed by a user, the communication terminal 20 transitions to the preparation state to establish direct communication.

(Step S423)

After transitioning to the preparation state, the communication terminal 20 searches for a nearby communication device capable of direct communication. Additionally, the operations according to steps S422 and S423 are the same as those in steps S122 and S123 (see FIG. 5).

(Step S424)

After recognizing a list of communication devices capable of direct communication, the communication terminal 20 presents the recognized list of communication devices to a user.

(Step S454)

The communication terminal 20 receives, from a user, the designation of a communication device with which direct communication is established. Let us here assume that the information processing device 10 that operates as a GO is designated as a communication partner.

(Steps S425a to S425c)

The communication terminal 20 reports, to the information processing device 10 via the access point 30 (5-GHz band) and the access point 30 (2.4-GHz band), the SSID of the access point 30 to which the communication terminal 20 is connected and a frequency band (i.e. frequency band of the communication path c20) used for communication with the access point 30.
(Step S413)

The frequency identifying unit 120 of the information processing device 10 acquires the SSID of the access point 30 and the frequency band of the communication path c20 from the communication terminal 20 via the access point 30 (5-GHz band) and the access point 30 (2.4-GHz band). The frequency identifying unit 120 reports the acquired SSID and the acquired frequency band of the communication path c20 to the communication control unit 130 of the information processing device 10.

The communication control unit 130 of the information processing device 10 acquires the SSID of the access point 30 and the frequency band of the communication path c20 from the frequency identifying unit 120. The communication control unit 130 compares the acquired SSID and the acquired frequency band with the SSID of the access point 30 that the information processing device 10 accesses and a frequency band (i.e. frequency band of the communication path c30) used for communication with the access point 30. These comparison results allow the communication control unit 130 to recognize whether or not the frequency band of the communication path c20 is equal to the frequency band of the communication path c30.
(Steps S414a to 414c)

After acquiring the SSID and the frequency transmitted from the communication terminal 20, the communication control unit 130 reports, to the communication terminal 20 via the access point 30 (2.4-GHz band) and the access point 30 (5-GHz band), that the SSID and the frequency band have been acquired. This allows the communication terminal 20 to recognize that the SSID and the frequency band transmitted to the information processing device 10 have been correctly received by the information processing device 10.
(Steps S415a to 415c)

Next, the communication control unit 130 of the information processing device 10 reports to the communication terminal 20 that a frequency band (i.e. frequency band of the communication path c30) used by the information processing device 10 for communication with the access point 30 is changed into the frequency (i.e. frequency band of the communication path c20) reported from the communication terminal 20. The communication control unit 130 then reports the report to the communication terminal 20 via the access point 30 (2.4-GHz band) and the access point 30 (5-GHz band).
(Step S416)

If the frequency band of the communication path c20 acquired from the communication terminal 20 is different from the frequency band of the communication path c30 set by the information processing device 10, the communication control unit 130 disconnects communication with the access point 30 to which the information processing device 10 is connected. In this case, the communication control unit 130 disconnects communication with the access point 30 (2.4-GHz band) to which the information processing device 10 is connected.
(Step S417)

After disconnecting communication with the access point 30 (2.4-GHz band), the communication control unit 130 changes the set frequency band of the communication path c30 into the acquired frequency band of the communication path c20. In this case, the set frequency band of the communication path c30 is changed into the 5-GHz band.

If the information processing device 10 is connected to the access point 30 different from that of the communication terminal 20, the communication control unit 130 may change the set access point 30 that the information processing device 10 accesses into the access point 10 indicated by the acquired SSID. Accordingly, if the information processing device 10 establishes wireless communication with the access point 30, the information processing device 10 is connected to the same access point 30 as that of the communication terminal 20 with the same frequency band.
(Step S426)

Once the communication terminal 20 receives a report regarding a change in the frequency band from the information processing device 10, the communication terminal 20 transitions to a mode in which the communication terminal 20 operates as a CLI in order to establish direct communication with the information processing device 10 that operates as a GO.
(Step S490)

Once the operation mode transitions to a CLI, the communication terminal 20 transmits, as a CLI, a connection request of direct communication to the information processing device 10 that serves as a GO. Once the information processing device 10 receives a connection request from the communication terminal 20, the information processing device 10 uses the identified frequency band (i.e. 5-GHz band) of the communication path c20 to establish the communication path c10 for direct communication with the communication terminal 20.
(Step S418)

The information processing device 10 uses the identified frequency band (i.e. 5-GHz band) of the communication path c20 to establish communication with the access point 30 (5-GHz band).

According to the above-described configuration, direct communication (communication path c10) is established between the information processing device 10 and the communication terminal 20, and the same frequency band is used for the respective kinds of communication among the information processing device 10, the communication terminal 20, and the access point 30. That is to say, both of the information processing device 10 and the communication terminal 20 do not have to switch and operate some kinds of communication for which different frequency bands are used. Accordingly, stable wireless communication can be established between the information processing device 10 and the communication terminal 20.

The communication terminal 20 does not necessarily have to establish a communication path with the information processing device 10 in order to transmit the SSID and the frequency band of the communication path c20 to the information processing device 10 in the example illustrated in FIG. 10. That is to say, as compared with the above-described example illustrated in FIG. 5, it is possible in some cases to lessen a processing load for a communication sequence between the information processing device 10 and the communication terminal 20 in the example illustrated in FIG. 10.

{3.2.2. Report of Frequency Band Through Contactless Communication}

Figure 11:
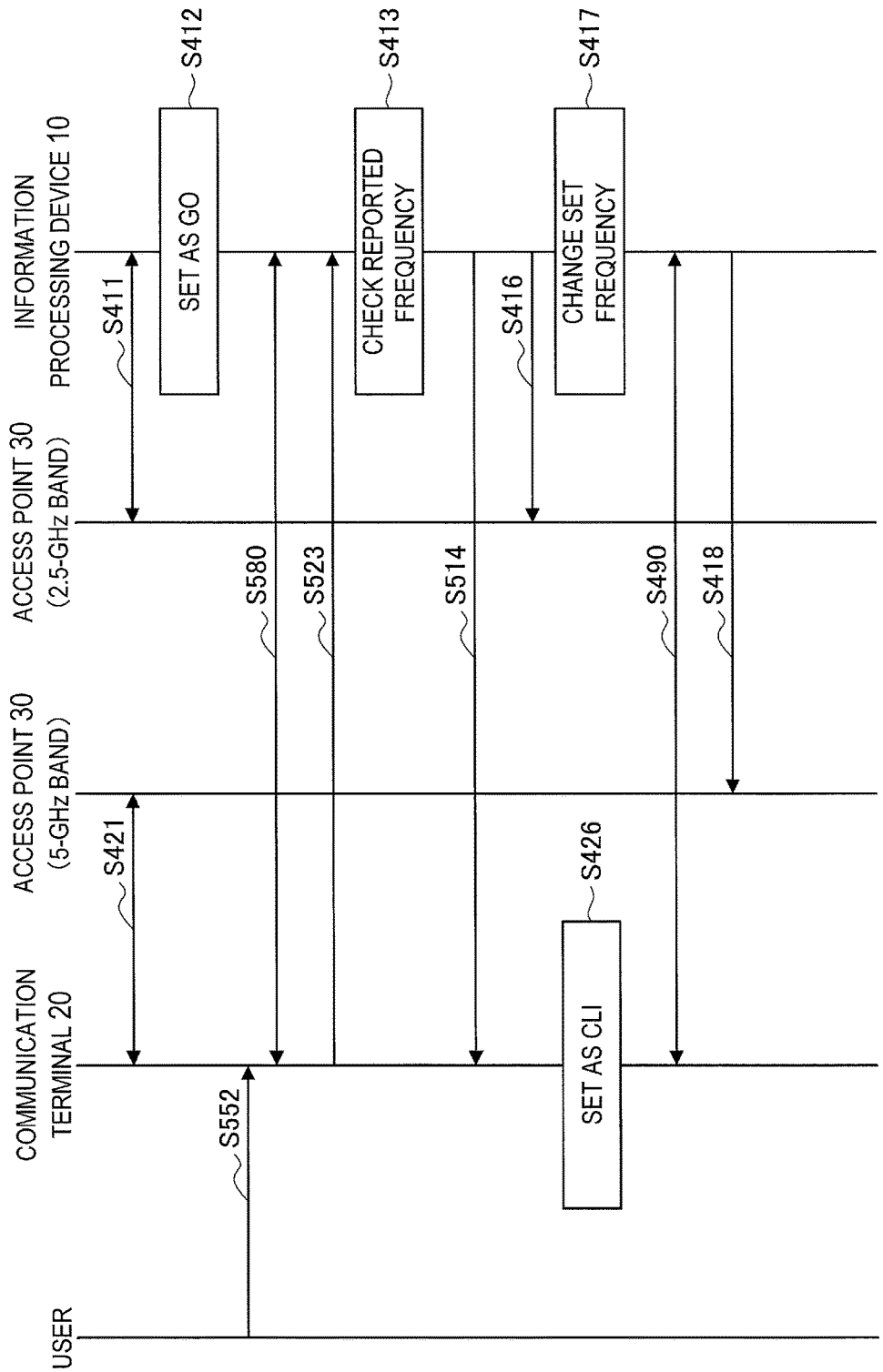
FIG. 11 is an example of a communication sequence of the wireless communication system according to the example.

Next, an operation of the frequency identifying unit 120 of the information processing device 10 to use contactless communication such as near field communication (NFC) to acquire the frequency of the communication path c20 from the communication terminal 20 will be described with reference to FIG. 11. FIG. 11 is an example of a communication sequence of the wireless communication system according to the present example, and illustrates an example flow of an operation of the frequency identifying unit 120 to use contactless communication to acquire the frequency of the communication path c20 from the communication terminal 20. Let us assume below that the information processing device 10 and the communication terminal 20 support contactless communication. The processes according to steps S411, S412, and S421 in FIG. 11 are the same as those of the example illustrated in FIG. 10. Accordingly, the detailed description of steps S411, S412, and S421 will be omitted.

(Steps S552 and S580)

A user puts an antenna of the communication terminal 20 for contactless communication close to an antenna of the information processing device 10 for contactless communication (step S552), thereby establishing a communication path for contactless communication between the communication terminal 20 and the information processing device 10 (step S580).

(Step S523)

After a communication path for contactless communication is established, the communication terminal 20 reports the SSID of the access point 30 to which the communication terminal 20 is connected and the frequency band of the communication path c20 to the information processing device 10 via the established communication path.

(Step S413)

The frequency identifying unit 120 of the information processing device 10 acquires the SSID of the access point 30 and the frequency band of the communication path c20 from the communication terminal 20 via a communication path for contactless communication. The frequency identifying unit 120 reports the acquired SSID and the acquired frequency band of the communication path c20 to the communication control unit 130 of the information processing device 10.

The communication control unit 130 of the information processing device 10 acquires the SSID of the access point 30 and the frequency band of the communication path c20 from the frequency identifying unit 120. The communication control unit 130 compares the acquired SSID and the acquired frequency band with the SSID of the access point 30 that the information processing device 10 accesses and a frequency band (i.e. frequency band of the communication path c30) used for communication with the access point 30. These comparison results allow the communication control unit 130 to recognize whether or not the frequency band of the communication path c20 is equal to the frequency band of the communication path c30.

(Step S514)

After acquiring the SSID and the frequency transmitted from the communication terminal 20, the communication control unit 130 reports to the communication terminal 20 via a communication path for contactless communication that the communication control unit 130 has acquired the SSID and the frequency band. This allows the communication terminal 20 to recognize that the SSID and the frequency band transmitted to the information processing device 10 have been correctly received by the information processing device 10.

Additionally, the following processes are the same as those of the example illustrated in FIG. 10. Accordingly, the detailed description will be omitted.

According to the above-described configuration, direct communication (communication path c10) is established between the information processing device 10 and the communication terminal 20, and the same frequency band is used for the respective kinds of communication among the information processing device 10, the communication terminal 20, and the access point 30. That is to say, both of the information processing device 10 and the communication terminal 20 do not have to switch and operate some kinds of communication for which different frequency bands are used. Accordingly, stable wireless communication can be established between the information processing device 10 and the communication terminal 20.

It is possible in the example illustrated in FIG. 11 to perform a process of transmitting and receiving information via a communication path for contactless communication independently from a communication sequence for establishing direct communication. Accordingly, the communication terminal 20 does not necessarily have to transition to the preparation state in order to transmit the SSID and the frequency band of the communication path c20 to the information processing device 10. That is to say, as compared with the above-described example illustrated in FIG. 5, it is possible in some cases to lessen a processing load for a communication sequence between the information processing device 10 and the communication terminal 20 in the example illustrated in FIG. 11.

4. Example 3

Next, it will be described as an example 3 that if the information processing device 10 and the communication terminal 20 are connected to different access points 30a and 30b, respectively, direct communication is established.

Figure 12:
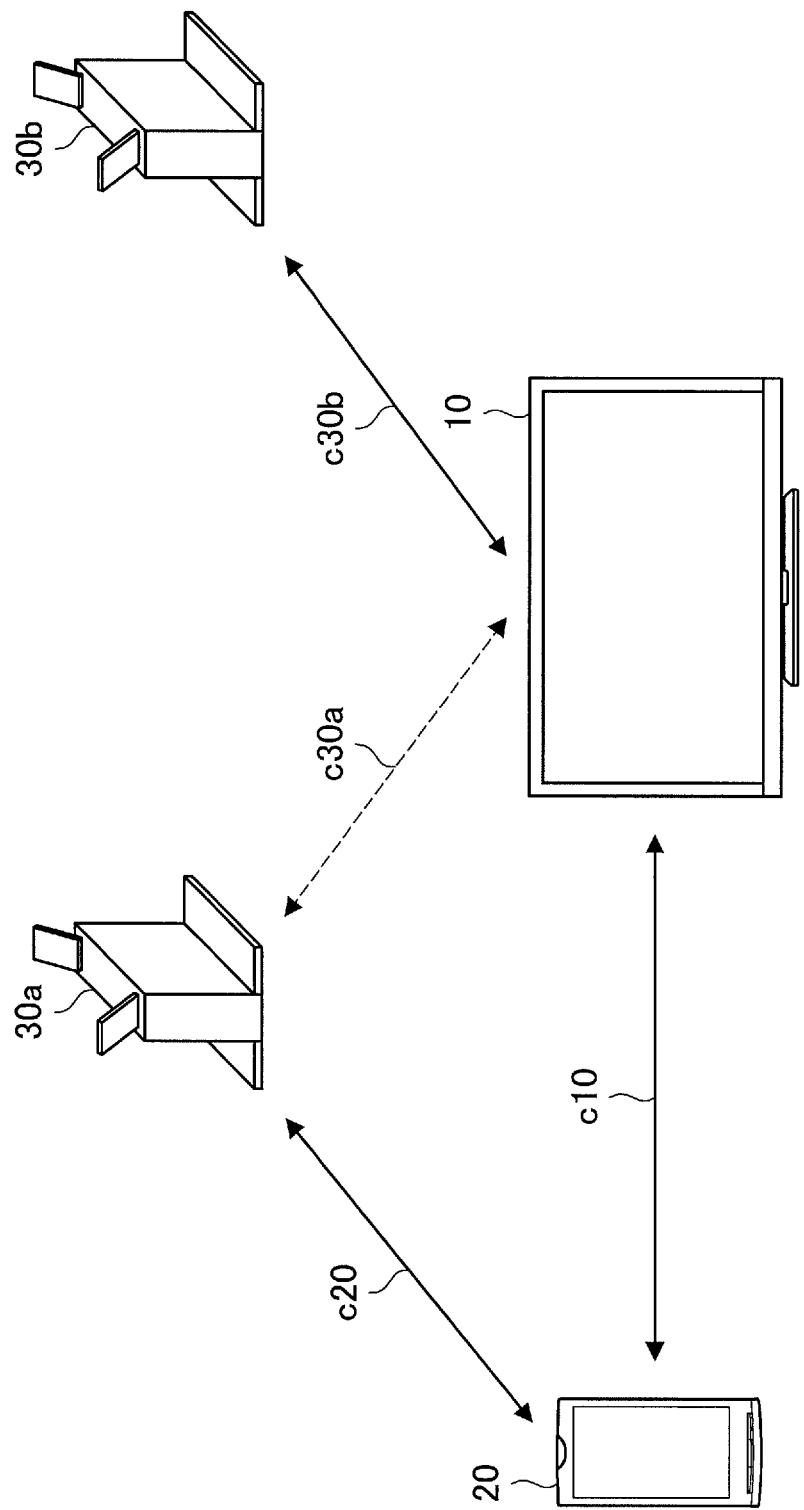
FIG. 12 is a diagram illustrating an example of a schematic configuration of a wireless communication system according to the example 3.

For example, FIG. 12 is a diagram illustrating a schematic configuration of the wireless communication system according to the example 3. Let us assume in the example illustrated in FIG. 12 that the communication terminal 20 has established the communication path c20 with the access point 30a, and the information processing device 10 has established a communication path c30b with the access point 30b via the communication path c30b. It is then assumed that the communication paths c20 and c30b (i.e. access points 30a and 30b) use different frequencies (channels) for communication.

It is difficult in this situation for the information processing device 10 to acquire a frequency (i.e. frequency of the communication path c20) used for the communication path c20 between the communication terminal 20 and the access point 30a even if the information processing device 10 accesses the access point 30b. Accordingly, if the information processing device 10 receives a connection request of direct communication from the communication terminal 20, the information processing device 10 causes the communication terminal 20 to report the frequency of the communication path c20, thereby identifying the frequency of the communication path c20.

Meanwhile, as discussed above, the information processing device 10 has established communication (communication path c30b) with the access point 30b different from a communication partner of the communication terminal 20. Accordingly, if the information processing device 10 establishes direct communication (communication path c10) with the communication terminal 20 by using the identified frequency of the communication path c20, the information processing device 10 has to perform communication while switching frequencies for the communication path c10 and the communication path c30b. That is to say, as discussed above, delay or the like is caused, so that stable communication become unavailable, or the communication performance degrades in some cases.

The frequency identifying unit 120 of the information processing device 10 according to the present example then acquires, from the communication terminal 20, the SSID of the access point 30*a* with which the communication terminal 20 has established communication, and reports the acquired SSID to the communication control unit 130. The communication control unit 130 compares the acquired SSID with the SSID of the access point 30*b* with which the information processing device 10 has established communication. If the acquired SSID is different from the SSID of the access point 30*b* with which the information processing device 10 has established communication, the communication control unit 130 disconnects communication with the access point 30*b* and establishes communication with the access point 30*a* indicated by the acquired SSID.

Once the communication is established with the access point 30*a* indicated by the acquired SSID, the frequency identifying unit 120 accesses the communication terminal 20 or the access point 30 to identify the frequency of the communication path c20. The frequency identifying unit 120 reports the identified frequency of the communication path c20 to the communication control unit 130.

The communication control unit 130 uses the acquired frequency of the communication path c20 to establish direct communication (communication path c10) with the communication terminal 20. Accordingly, some kinds of communication are established among the information processing device 10, the communication terminal 20, and the access point 30*a*, and the setting is changed in a manner that the same frequency band is used for each communication path.

In this way, if the information processing device 10 has established communication with the access point 30*b* different from that of the communication terminal 20, the information processing device 10 disconnects the communication and establishes communication with the same access point 30*a* as that of the communication terminal 20 in the wireless communication system according to the present example. The information processing device 10 then identifies the frequency of the communication path c20, and uses the identified frequency to establish direct communication (communication path c10) with the communication terminal 20. Accordingly, there is no need for each of the information processing device 10 and the communication terminal 20 to switch and operate some kinds of communication for which different frequency bands are used, so that it is possible to establish stable wireless communication between the information processing device 10 and the communication terminal 20.

Additionally, the above-described example is just an example, and the operation of the wireless communication system according to the example 3 is not limited thereto. For example, when the information processing device 10 establishes direct communication with the communication terminal 20, the information processing device 10 does not necessarily have to establish communication with the access point 30*a* as long as there is no need for the information processing device 10 to establish wireless communication with a device other than the communication terminal 20 (e.g. a connection with an external network is not necessary).

As another example, if the identified frequency of the communication path c20 is different from a frequency used for the communication path c30*b*, the information processing device 10 may reject a connection request of direct communication from the communication terminal 20. In addition, if the identified frequency of the communication path c20 is different from a frequency used for the communication path c30, the information processing device 10 may disconnect the communication path c30*b* and operate as a CLI to establish direct communication with the communication terminal 20. Needless to say, the communication terminal 20 operates as a GO in this case.

5. Example 5

Figure 13:
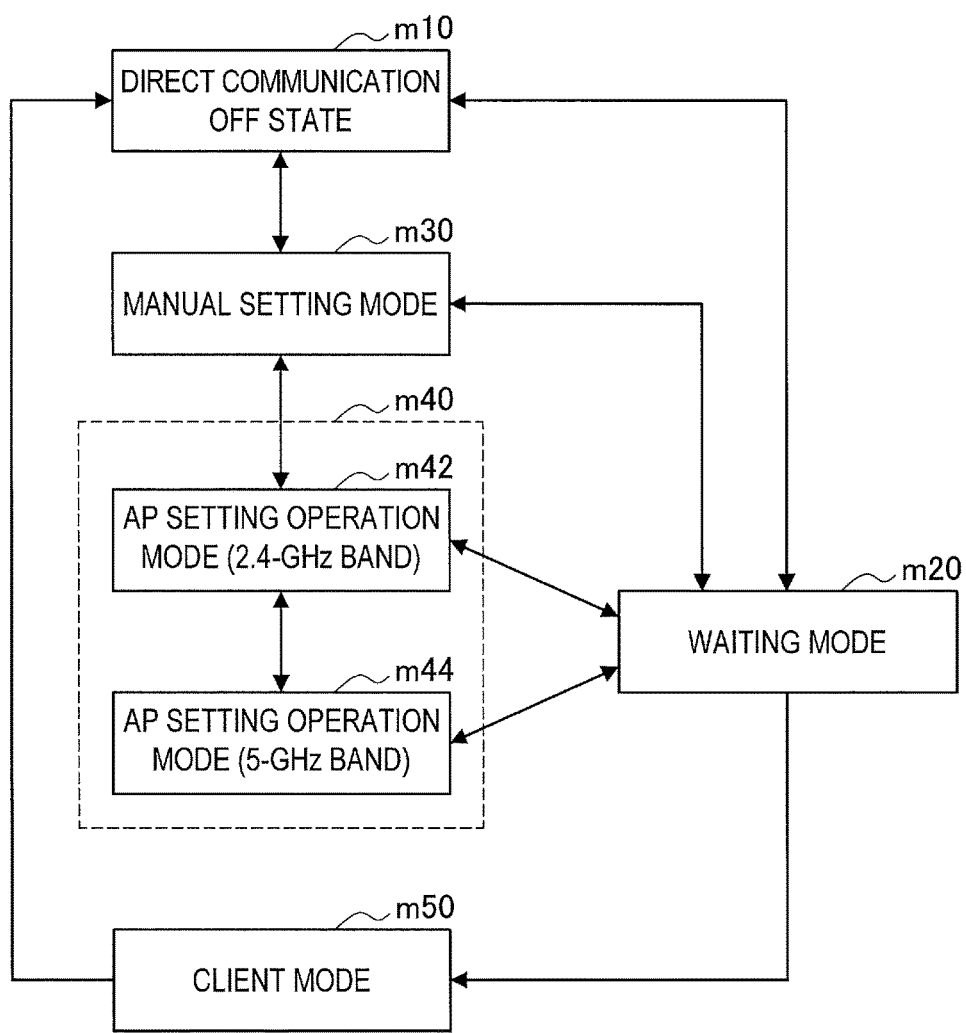
FIG. 13 is a state transition diagram for describing that operation modes of an information processing device in a wireless communication system according to an example 4 are switched.

[5.1. Overview of Each Mode]
The following is a method for the information processing device 10 to establish direct communication (communication path c10) with the communication terminal 20.
(1) Method in Which Information Processing Device 10 Operates as GO
(1-1) Method According to Setting of Access Point (Method Shown in Embodiment)
(1-2) Method in Which User Manually Sets Frequency (Channel)
(2) Method in Which Information Processing Device 10 Operates as CLI An example in which the state of the information processing device 10 transitions when the methods shown in (1-1), (1-2), and (2) are switched will be described as an example 4. FIG. 13 is a state transition diagram for describing that operation modes of an information processing device in a wireless communication system according to an example 4 are switched.

First of all, each mode illustrated in FIG. 13 will be described. A direct connection off state m10 represents a state in which direct communication is not established. In this mode, the information processing device 10 does not establish a connection path c10 with the communication terminal 20, but establishes the communication path c30 with the access point 30 (or the communication path c32 illustrated in FIG. 8).

A manual setting mode m30 and an AP setting operation mode m40 are each an operation mode in which the information processing device 10 operates as a GO. In this case, the communication terminal 20 operates as a CLI, and communicates with the information processing device 10 that serves as a GO by using a frequency (channel) reported from the information processing device 10. That is to say, a frequency used for the communication path c10 between the information processing device 10 and the communication terminal 20 is decided by the information processing device 10 that serves as a GO in the manual setting mode m30 and the AP setting operation mode m40.

The manual setting mode m30 is a mode in which a user sets a frequency used for direct communication with the communication terminal 20. In this manual setting mode m30, a user sets, in accordance with the setting of the communication terminal 20, what frequency (channel) the information processing device 10 uses. Additionally, the information processing device 10 may be operable to scan the nearby communication terminal 20, to present, to a user, information on the communication terminal 20 acquired on the basis of a scanning result, and to use a frequency used by the communication terminal 20 designated by the user.

As discussed above, the AP setting operation mode m40 is a mode in which the information processing device 10 identifies a frequency (frequency of the communication path c20) used for communication between the communication terminal 20 and the access point 30, and establishes direct communication with the communication terminal 20 on the basis of the identified frequency. The AP setting operation mode m40 includes an AP setting operation mode (2.4-GHz band) m42 and an AP setting operation mode (5-GHz band) m44 in accordance with a frequency band to be used.

The AP setting operation mode (2.4-GHz band) m42 is a mode in which the 2.4-GHz band is used for communication with the communication terminal 20 and the access point 30. The AP setting operation mode (5-GHz band) m44 is a mode in which the 5-GHz band is used for communication with the communication terminal 20 and the access point 30.

A client mode m50 is a mode in which the information processing device 10 operates as a CLI. In this case, the communication terminal 20 operates as a GO, and the information processing device 10 uses a frequency (channel) reported from the communication terminal 20 that serves as a GO to communicate with the communication terminal 20. That is to say, a frequency used for the communication path c10 between the information processing device 10 and the communication terminal 20 is decided by the communication terminal 20 that serves as a GO.

Additionally, a waiting mode m20 is additionally installed in which a connection request of direct communication is received in the example illustrated in FIG. 13. This waiting mode m20 is a mode for explicitly separating a state in which a connection request of direct communication is received from another state. That is to say, the present example shows an example in which a connection request of direct communication is not received in a mode other than the waiting mode m20. This waiting mode m20 is also a mode (i.e. preparation state) for the information processing device 10 to decide as which of a GO and a CLI the communication terminal 20 operates. Additionally, a state in which the information processing device 10 has transitioned to the waiting mode m20 will also be referred to as preparation state below.

Installing the waiting mode m20 in this way distinguishes, for example, a mode in which information (such as a screen and video content of the communication terminal 20) is displayed on the display unit 101 from a mode in which a connection request of direct communication is received when the information processing device 10 is configured as a display device such as a television receiver. Accordingly, for example, when the display unit 101 displays video content and a connection request is received from another nearby communication terminal 20, it is possible to prevent a report (such as a pop-up screen) indicating that this connection request has been received from showing up in the video content.

[5.2. Transition Between Respective Modes]

Next, an example of a transition between respective modes will be described. If communication is not established with the communication terminal 20 and no connection request of direct communication is received from the communication terminal 20, the information processing device 10 is in the direct connection off state m10. Once the information processing device 10 receives an instruction of direct communication from a user, the information processing device 10 transitions from the direct connection off state m10 to the manual setting mode m30 or the waiting mode m20.

For example, if the information processing device 10 is instructed by a user to directly input a set frequency or the like for direct communication without the techniques disclosed herein or the like, the information processing device 10 transitions to the manual setting mode m30 and receives a user input for direct communication.

Meanwhile, if the information processing device 10 is instructed by a user to set direct communication, the information processing device 10 transitions to the waiting mode m20. In the waiting mode m20, the information processing device 10 is designated by a user to operate as a GO or a CLI, and decides the next mode to which the information processing device 10 transitions on the basis of the designation from the user.

(Operation of Information Processing Device 10 as GO)

For example, if the information processing device 10 is instructed by a user to operate as a GO, the information processing device 10 operates as a GO and receives a connection request of direct communication from the communication terminal 20 that serves as a CLI. The information processing device 10 may then temporarily stop communication with the access point 30. If the information processing device 10 receives connections requests of direct communication from a plurality of communication terminals 20, the information processing device 10 may present the plurality of communication terminals 20 to a user as candidates and allow the user to decide with which of the communication terminals 20 direct communication is established.

Once the information processing device 10 receives a connection request of direct communication from the communication terminal 20, the information processing device 10 accesses the communication terminal 20 or the access point 30 to identify a frequency band (i.e. frequency band of the communication path c20) used for communication between the communication terminal 20 and the access point 30. The information processing device 10 decides any of the AP setting operation mode (2.4-GHz band) m42 and the AP setting operation mode (5-GHz band) m44 as the next mode to which the information processing device 10 transitions in accordance with which of the 2.4-GHz band and the 5-GHz band the identified frequency band is. In addition, the information processing device 10 changes a set frequency band used for communication with the access point 30 into the identified frequency band of the communication path c20.

The information processing device 10 accesses the communication terminal 20 or the access point 30 to identify a frequency (i.e. frequency of the communication path c20) used for communication between the communication terminal 20 and the access point 30. After identifying the frequency of the communication path c20, the information processing device 10 changes a set frequency used for communication with the access point 30 into the identified frequency of the communication path c20. The information processing device 10 then establishes direct communication (communication path c10) with the communication terminal 20 on the basis of the identified frequency band of the communication path c20 and the identified frequency of the communication path c20.

Establishing direct communication with the communication terminal 20 causes the information processing device 10 to transition to any of the AP setting operation mode (2.4-GHz band) m42 and the AP setting operation mode (5-GHz band) m44 in accordance with the identified frequency band of the communication path c20. If communication with the access point 30 is stopped in the waiting mode m20, the information processing device 10 may resume communication with the access point 30. In this case, communication between the information processing device 10 and the access point 30 is based on the frequency band of the communication path c20 and the frequency of the communication path c20.

If direct communication with the communication terminal 20 is finished (or disconnected), the information processing device 10 transitions to the waiting mode m20 again. The information processing device 10 may then temporarily stop communication with the access point 30.

If direct communication with the communication terminal 20 is finished (or disconnected), the information processing device 10 transitions to the waiting mode m20 again. The information processing device 10 may then temporarily stop communication with the access point 30. Alternatively, if the function is turned on by a user from the direct communication off state m10, the information processing device 10 may transition to the AP setting operation mode (2.4-GHz band) m42 and the AP setting operation mode (5-GHz band) m44, operate as a GO, and waits for a connection of a CLI in accordance with the last setting. If direct communication with the communication terminal 20 is then finished (or disconnected), the information processing device 10 does not have to automatically transition to the waiting mode m20, but may wait for a connection of a CLI in m42 or m44 until a user explicitly indicates the mode m20.

(Operation of Information Processing Device 10 as CLI)

Next, an operation of the information processing device 10 as a CLI will be described. If the information processing device 10 is instructed by a user to operate as a CLI, the information processing device 10 searches for the communication terminal 20 that operates as a GO and transmits a connection request of direct communication to the communication terminal 20.

The information processing device 10 acquires a frequency band and a frequency used for direct communication from the communication terminal 20 that serves as a GO, and establishes direct communication with the communication terminal 20 on the basis of the acquired frequency band and the acquired frequency.

Establishing direct communication with the communication terminal 20 that serves as a GO causes the information processing device 10 to transition to the client mode m50. If the information processing device 10 operates in the client mode m50, the information processing device 10 may stop communication with the access point 30.

If direct communication with the communication terminal 20 that serves as a GO is finished (or disconnected), the information processing device 10 transitions to the direct connection off state m10. If the information processing device 10 then stops communication with the access point 30, the information processing device 10 may resume communication with the access point 30.

Additionally, the example illustrated in FIG. 13 is just an example, and the state transition of the information processing device 10 is not limited to the example illustrated in FIG. 13. For example, the waiting mode m20 is not installed, and the information processing device 10 may always receive a connection request of direct communication.

[5.3. Process Flow]

Figure 14:
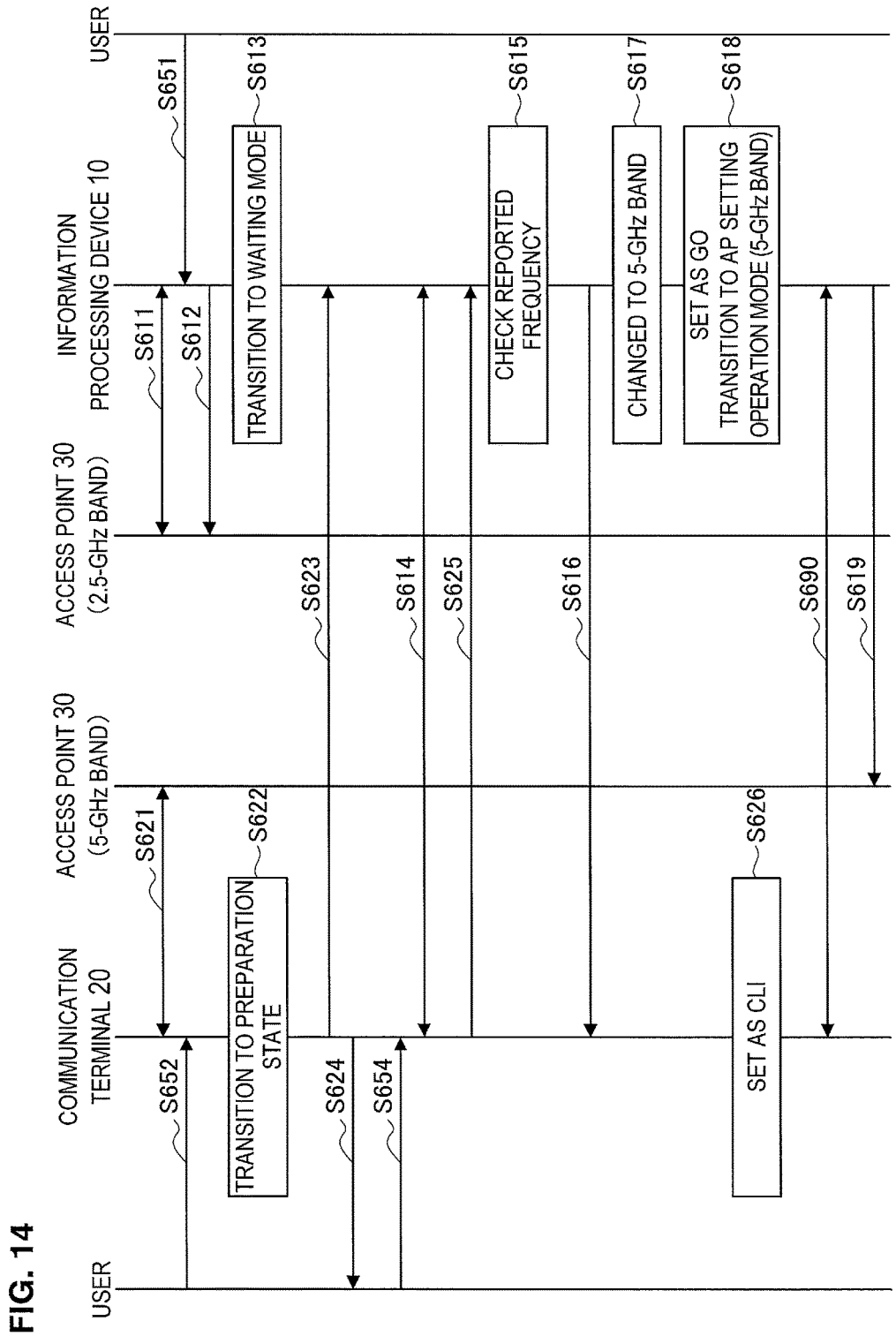
FIG. 14 is an example of a communication sequence of the wireless communication system according to the example.
Figure 15:
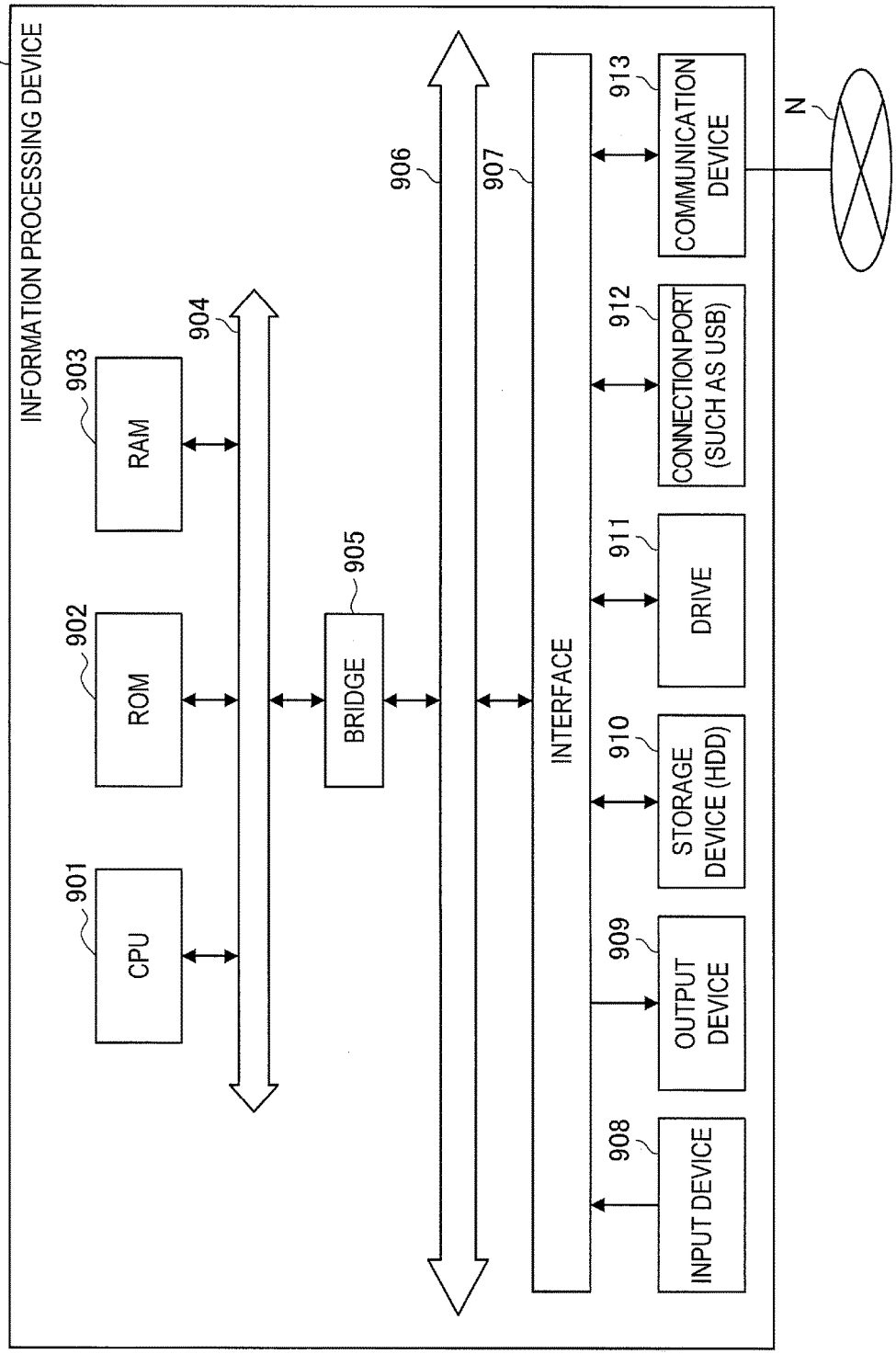
FIG. 15 is an example of a hardware configuration of an information processing device according to an embodiment of the present disclosure.

Next, a detailed operation of the information processing device 10 to transition from the waiting mode m20 to the AP setting operation mode m40 will be described with reference to FIG. 14 by using a transition to the AP setting operation mode (5-GHz band) m44 as an example. FIG. 14 is an example of a communication sequence of the wireless communication system according to the present example, and illustrates an example of an operation of the information processing device 10 to transition from the waiting mode m20 to the AP setting operation mode (5-GHz band) m44. Additionally, the processes according to steps S611 and S621 are the same as those of the examples of steps S411 and S421 illustrated in FIG. 10. Accordingly, the detailed description of steps S611 and S621 will be omitted.

(Step S651)

The information processing device 10 receives an instruction from a user, and is instructed to operate in a mode (waiting mode m20) in which the information processing device 10 receives a connection request of direct communication.

(Steps S612 and S613)

Once the information processing device 10 receives an instruction from a user, the information processing device 10 disconnects communication with the access point 30 (2.4-GHz band) (step S612) and transitions to the waiting mode m20.

(Step S652)

The communication terminal 20 is instructed by a user to transfer (i.e. direct communication with the information processing device 10) a screen to the information processing device 10 with a display transmission technique.

(Step S622)

Once the communication terminal 20 is instructed by a user, the communication terminal 20 transitions to the preparation state to establish direct communication.

(Step S623)

After transitioning to the preparation state, the communication terminal 20 searches for a nearby communication device capable of direct communication. As a specific example, the communication terminal 20 receives a beacon from a nearby communication device, and recognizes the nearby communication device by using the beacon. Accordingly, the communication terminal 20 recognizes the presence of the information processing device 10 that operates as a GO.

(Step S624)

After recognizing a list of communication devices capable of direct communication, the communication terminal 20 presents the recognized list of communication devices to a user.

(Step S654)

The communication terminal 20 receives, from a user, the designation of a communication device with which direct communication is established. Let us here assume that the information processing device 10 that operates as a GO is designated as a communication partner. The information processing device 10 and the communication terminal 20 transition at this moment to the preparation state (such as the waiting mode m20) in which direct communication is established between both of the information processing device 10 and the communication terminal 20.

(Step S614)

Once both of the information processing device 10 and the communication terminal 20 transition to the preparation state, the information processing device 10 and the communication terminal 20 decide which of the information processing device 10 and the communication terminal 20 operates as a GO. As a specific example, the information processing device 10 and the communication terminal 20 decide weighting for operating as a GO in advance, and the information processing device 10 and the communication terminal 20 decides on the basis of the weighting which of the information processing device 10 and the communication terminal 20 operates as a GO. The above-described weighting is not limiting as long as it can be decided which of the information processing device 10 and the communication terminal 20 operates as a GO. Let us assume below that the information processing device 10 operates as a GO.

(Step S625)

Next, the communication terminal 20 reports, to the information processing device 10, the SSID of the access point 30 to which the communication terminal 20 is connected and a frequency band (i.e. frequency band of the communication path c20) used for communication with the access point 30. An example in which the communication terminal 20 reports the frequency band of the communication path c20 to the information processing device 10 will be described below, but the same method can also be applied when the frequency of the communication path c20 is reported. Thus, what will be described for the "frequency band" can also be applied to the "frequency" below.

(Step S615)

The frequency identifying unit 120 of the information processing device 10 acquires the SSID of the access point 30 and the frequency band of the communication path c20 from the communication terminal 20. The frequency identifying unit 120 reports the acquired SSID and the acquired frequency band of the communication path c20 to the communication control unit 130 of the information processing device 10.

The communication control unit 130 of the information processing device 10 acquires the SSID of the access point 30 and the frequency band of the communication path c20 from the frequency identifying unit 120. The communication control unit 130 compares the acquired SSID and the acquired frequency band with the SSID of the access point 30 that the information processing device 10 accesses and a frequency band (i.e. frequency band of the communication path c30) used for communication with the access point 30. These comparison results allow the communication control unit 130 to recognize whether or not the frequency band of the communication path c20 is equal to the frequency band of the communication path c30.

(Step S616)

Next, the communication control unit 130 of the information processing device 10 reports to the communication terminal 20 that a frequency band (i.e. frequency band of the communication path c30) used by the information processing device 10 for communication with the access point 30 is changed into the frequency band (i.e. frequency band of the communication path c20) reported from the communication terminal 20.

(Step S617)

If the frequency band of the communication path c20 acquired from the communication terminal 20 is different from the frequency band of the communication path c30 set by the information processing device 10, the communication control unit 130 changes the set frequency band of the communication path c30 into the acquired frequency band of the communication path c20. In this case, the set frequency band of the communication path c30 is changed into the 5-GHz band.

If the information processing device 10 is connected to the access point 30 different from that of the communication terminal 20, the communication control unit 130 may change the set access point 30 that the information processing device 10 accesses into the access point 10 indicated by the acquired SSID. Accordingly, if the information processing device 10 establishes wireless communication with the access point 30, the information processing device 10 is connected to the same access point 30 as that of the communication terminal 20 with the same frequency band.

(Step S618)

After changing the set frequency band of the communication path c30 into the frequency band of the communication path c20, the information processing device 10 transitions to the AP setting operation mode (5-GHz band) m44 (i.e. mode in which the information processing device 10 operates as a GO) and waits for a connection request from a CLI.

(Step S626)

Once the communication terminal 20 receives a report regarding a change in the frequency band from the information processing device 10, the communication terminal 20 transitions to a mode in which the communication terminal 20 operates as a CLI in order to establish direct communication with the information processing device 10 that operates as a GO.

(Step S690)

Once the operation mode transitions to a CLI, the communication terminal 20 transmits, as a CLI, a connection request of direct communication to the information processing device 10 that serves as a GO. Once the information processing device 10 receives a connection request from the communication terminal 20, the information processing device 10 uses the identified frequency band (i.e. 5-GHz band) of the communication path c20 to establish the communication path c10 for direct communication with the communication terminal 20.

(Step S619)

The information processing device 10 uses the identified frequency band (i.e. 5-GHz band) of the communication path c20 to establish communication with the access point 30 (5-GHz band).

In this way, a state transition of the information processing device 10 has been described in the present example in which a plurality of modes for direct communication are switched and operated as appropriate between the information processing device 10 and the communication terminal 20. Switching the respective modes as described above allows the information processing device 10 to decide a method for establishing direct communication with the communication terminal 20 in accordance with an instruction from a user and the setting (frequency band and frequency to be used) of the communication terminal 20.

6. Hardware Configuration

The embodiment of the present disclosure has been described so far. The above-described information processing by the information processing device 10 is implemented in cooperation with hardware of the information processing device 10 as described below. Additionally, the communication terminal 20 may also be configured in the same way.

FIG. 12 is an explanatory diagram illustrating an example of the hardware configuration of the information processing device 10. As illustrated in FIG. 12, the information processing device 90 includes a central processing unit (CPU) 901, read only memory (ROM) 902, random access memory (RAM) 903, an input device 908, an output device 910, a storage device 911, a drive 912, and a communication device 915.

The CPU 901 functions as a processing device and a control device, and controls the whole operation of the information processing device 10 in accordance with a variety of programs. The CPU 901 may also be a microprocessor. The ROM 902 stores a program, an operation parameter, or the like that is used by the CPU 901. The RAM 903 temporarily stores a program used upon execution of the CPU 901, a parameter that changes as necessary for the execution, or the like. These are connected to each other by a host bus including a CPU bus.

The input device 908 is made of, for example, input means such as a button and a switch for allowing a user to input information, and an input control circuit for generating an input signal on the basis of an input from a user and outputting the input signal to the CPU 901. A user of the information processing device 10 can input a variety of data to the information processing device 10 and require the information processing device 10 to perform a processing operation by operating the input device 908.

The output device 910 includes a display device such as a liquid crystal display (LCD) device, an organic light emitting diode (OLED) device, and a lamp. The output device 910 further includes an audio output device such as a speaker and a headphone. The display device, for example, displays a shot image, a generated image, and the like. Meanwhile, the audio output device converts audio data and the like to a sound, and outputs the sound.

The storage device 911 is a data storage device configured as an example of the storage unit of the information processing device 10 according to the present embodiment. The storage device 911 may include a storage medium, a recording device that records data on a storage medium, a read-out device that reads data out from a storage medium, and a deletion device that deletes data recorded on a storage medium. The storage device 911 stores a program and various kinds of data executed by the CPU 901.

The drive 912 is a reader/writer for a storage medium, and is built in or externally attached to the information processing device 10. The drive 912 reads out information recorded on a removable storage medium such as a mounted magnetic disk, an optical disc, a magneto-optical disk, and semiconductor memory, and outputs the read-out information to the RAM 903. The drive 912 can also write information into a removable storage medium.

The communication device 915 is, for example, a communication interface including a communication device and the like for a connection to the network N. In particular, the communication device 915 according to an embodiment of the present disclosure includes a communication device that supports a wireless local area network (LAN). Additionally, the communication device 915 may also include a communication device that supports long term evolution (LTE) and a wired communication device that performs wired communication.

Additionally, the network N is a wired or wireless transmission path through which information is transmitted from a device connected to the network N. The network N may include public networks such as the Internet, telephone networks and satellite networks, a variety of local area networks (LANs) including Ethernet (registered trademark), and wide area networks (WANs). The network N may also include leased line networks such as Internet protocol-virtual private networks (IP-VPNs). Needless to say, if the information processing device 10 establishes direct communication with the communication terminal 20, the network N represents a wireless transmission path.

The hardware configuration illustrated in FIG. 12 is merely an example, and is not limiting as long as it is possible to implement the above-described operations of the information processing device 10 and the communication terminal 20 according to an embodiment of the present disclosure.

7. Conclusion

In this way, the information processing device 10 identifies a frequency (i.e. frequency of the communication path c20) used for communication between the communication terminal 20 and the access point 30 in the wireless communication system according to an embodiment of the present disclosure. The information processing device 10 then changes the setting of communication (communication path c30) in a manner that the identified frequency is used to perform communication with the access point 30, and uses the identified frequency to establish direct communication (communication path c10) with the communication terminal 20. Accordingly, the same frequency (i.e. frequency of the communication path c20) is used for the respective kinds of communication among the information processing device 10, the communication terminal 20, and the access point 30. The information processing device 10 does not thus have to switch and operate some kinds of communication for which different frequencies are used. This can also be applied to communication (communication path c10) with the information processing device 10 and communication (communication path c20) with the access point 30 as seen from the communication terminal 20. That is to say, the communication terminal 20 does not have to switch and operate some kinds of communication for which different frequencies are used. Accordingly, stable wireless communication can be established between the information processing device 10 and the communication terminal 20 in the wireless communication system according to an embodiment of the present disclosure.

It has be described so far that a display device such as a television receiver is used for the information processing device 10, but any configuration can be adopted as long as the information processing device is capable of wireless communication. For example, the information processing device 10 may be a personal computer (PC) or the communication terminal 20 (smartphone). The description has been made so far by using the display transmission technique referred to as Miracast as an example, but this is merely an example and any other display transmission technique can be adopted as long as direct communication is established between the information processing device 10 and the communication terminal 20.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a frequency identifying unit configured to identify a frequency used for wireless communication between another information processing device and an access point on the basis of communication; and a communication control unit configured to use the acquired frequency to establish wireless communication with the other information processing device.

(2)

The information processing device according to (1), wherein the frequency identifying unit acquires the frequency from the other information processing terminal (3)

The information processing device according to (2), wherein the frequency identifying unit acquires the frequency from the other information processing terminal via the access point.

(4)

The information processing device according to (2), wherein the frequency identifying unit acquires the frequency from the other information processing terminal through contactless communication with the other information processing device.

(5)
The information processing device according to (1), wherein the frequency identifying unit accesses the access point to identify the frequency.

(6)
The information processing device according to (5), wherein the frequency identifying unit scans the frequency usable by the access point to identify the frequency on the basis of a scanning result.

(7)
The information processing device according to any one of (1) to (6), wherein the communication control unit uses a frequency band used for wireless communication between the other information processing device and the access point among a plurality of different frequency bands to establish wireless communication with the other information processing device.

(8)
The information processing device according to (7), wherein the communication control unit is configured to be capable of controlling communication with another communication device different from the other information processing device with a first frequency band among the plurality of frequency bands, and when the first frequency band is different from a second frequency band used for wireless communication between the other information processing device and the access point, the communication control unit disconnects communication for which the first frequency band is used.

(9)
The information processing device according to any one of (1) to (8), wherein the communication control unit is configured to be capable of communicating with a second access point different from a first access point with which the other information processing device is capable of communicating, and when a first frequency used for wireless communication between the other information processing device and the first access point is different from a second frequency used for wireless communication with the second access point, the communication control unit disconnects communication based on the second frequency and establishes wireless communication with the other information processing device on the basis of the first frequency.

(10)
A wireless communication system including:
an access point;
a first information processing device capable of communicating with the access point; and
a second information processing device different from the first information processing device,
wherein the second information processing device includes
a frequency identifying unit configured to identify a frequency used for wireless communication between the first information processing device and the access point on the basis of communication, and
a communication control unit configured to use the acquired frequency to establish wireless communication with the first information processing device.

(11)
An information processing method including:
identifying a frequency used for wireless communication between another information processing device and an access point on the basis of communication; and
using the acquired frequency to establish wireless communication with the other information processing device.

REFERENCE SIGNS LIST 10 information processing device
101 display unit
110 communication unit
120 frequency identifying unit
130 communication control unit
20, 20a, 20b communication terminal
201 display unit
30, 30a, 30b access point

The invention claimed is:

1. A first information processing device, comprising:
circuitry configured to:
acquire a first frequency from a second information processing device;
identify, based on the acquired first frequency, a second frequency used for a first wireless communication between the second information processing device and a first access point; and
establish a second wireless communication with the second information processing device at the second frequency.

2. The first information processing device according to claim 1, wherein the circuitry is further configured to acquire the first frequency from the second information processing device via the first access point.

3. The first information processing device according to claim 1, wherein the circuitry is further configured to acquire the first frequency from the second information processing device through contactless communication with the second information processing device.

4. The first information processing device according to claim 1, wherein the circuitry is further configured to access the first access point to identify the second frequency.

5. The first information processing device according to claim 4, wherein the circuitry is further configured to:
scan a third frequency used for wireless communication by the first access point; and
identify the second frequency based on the third frequency.

6. The first information processing device according to claim 1, wherein the circuitry is further configured to:
establish the second wireless communication based on a first frequency band among a plurality of frequency bands, wherein the first frequency band is associated with the first wireless communication.

7. The first information processing device according to claim 6, wherein the circuitry is further configured to:
control a third wireless communication with a communication device, different from the second information processing device, based on a second frequency band among the plurality of frequency bands; and
terminate the third wireless communication, based on the first frequency band and the second frequency band.

8. The first information processing device according to claim 1, wherein the circuitry is further configured to:
communicate with a second access point different from the first access point;
disconnect the communication with the second access point based on a difference between the second frequency and a third frequency associated with the second access point; and
establish the second wireless communication with the second information processing device at the second frequency.

9. The first information processing device according to claim 1, wherein the circuitry is further configured to:
determine that a third frequency, used for a third wireless communication between the first information processing device and the first access point, is different from the second frequency;

select the second frequency, based on the determination that the third frequency is different from the second frequency; and establish the third wireless communication and the second wireless communication at the second frequency.

10. A wireless communication system, comprising:

a first access point;

a first information processing device configured to communicate with the first access point; and a second information processing device different from the first information processing device, wherein the second information processing device includes:

circuitry configured to:

acquire a first frequency from the second information processing device;

identify, based on the acquired first frequency, a second frequency used for a first wireless communication between the first information processing device and the first access point; and establish a second wireless communication with the first information processing device at the second frequency.

11. An information processing method, comprising:

in a first information processing device:

acquiring a first frequency from a second information processing device;

identifying, based on the acquired first frequency, a second frequency used for first wireless communication between the second information processing device and an access point; and establishing a second wireless communication with the second information processing device at the identified second frequency.

\* \* \* \* \*